(12) United States Patent
Seawall et al.

(10) Patent No.: US 12,223,307 B2
(45) Date of Patent: Feb. 11, 2025

(54) SMART EDGE PLATFORM FOR EDGE DEVICES AND ASSOCIATED SYSTEMS AND METHODS

(71) Applicant: Numurus LLC, Seattle, WA (US)

(72) Inventors: Jason Leonard Seawall, Seattle, WA (US); Ian Charles McKissick, Bellevue, WA (US); Josh Rafael Maximoff, Afton, TN (US)

(73) Assignee: Numurus LLC, Seattle, WA (US)

( * ) Notice: Subject to any disclaimer, the term of this patent is extended or adjusted under 35 U.S.C. 154(b) by 278 days.

(21) Appl. No.: 17/869,446

(22) Filed: Jul. 20, 2022

(65) Prior Publication Data

US 2023/0028638 A1 Jan. 26, 2023

Related U.S. Application Data

(60) Provisional application No. 63/223,924, filed on Jul. 20, 2021.

(51) Int. Cl.
*G06F 9/44* (2018.01)
*G06F 8/61* (2018.01)
(Continued)

(52) U.S. Cl.
CPC .................. *G06F 8/65* (2013.01); *G06F 8/61* (2013.01); *G06F 9/452* (2018.02)

(58) Field of Classification Search
None
See application file for complete search history.

(56) References Cited

U.S. PATENT DOCUMENTS

2014/0053261 A1* 2/2014 Gupta ................ G06F 8/61
717/171
2017/0344038 A1* 11/2017 Zhou ................ H05B 35/00
(Continued)

FOREIGN PATENT DOCUMENTS

JP 2019-022205 2/2019
KR 2021-0216851 7/2021

OTHER PUBLICATIONS

International Search Report and Written Opinion received for counterpart International Application No. PCT/US2022/037737 mailed Nov. 4, 2022 (12 pages).

*Primary Examiner* — Qamrun Nahar
(74) *Attorney, Agent, or Firm* — Perkins Coie LLP

(57) ABSTRACT

Smart sensors, platforms for smart sensors, and associated systems and methods, are disclosed herein. In some implementations, the platform includes hardware interfaces that are abstracted and/or standardized as defined by various common group types. The abstracted interfaces allow numerous different sensors to be connected and integrated into the smart sensor as desired for a specific application. Further, the platform can reuse a standardized software backbone as a sensor platform as sensors are varied, as well as across multiple smart sensors. In some implementations, the standardized sensor platform can include an on-board resident user interface (RUI) with an internet-accessible portal, allowing users to connect to the RUI on the sensor platform through any network accessible device. The platform can also include an artificial intelligence and/or machine learning engine to turn raw sensor data into real-time automation and inspection information within the sensor within the local environment.

20 Claims, 24 Drawing Sheets

(51) Int. Cl.
*G06F 8/65* (2018.01)
*G06F 9/451* (2018.01)

(56) References Cited

U.S. PATENT DOCUMENTS

| | | | |
|---|---|---|---|
| 2018/0007115 A1* | 1/2018 | Nedeltchev | H04L 67/51 |
| 2020/0112609 A1* | 4/2020 | Hardman, III | H04L 45/22 |
| 2021/0216851 A1* | 7/2021 | Lee | G06N 3/042 |
| 2021/0405185 A1* | 12/2021 | Price | G01S 13/931 |

* cited by examiner

PAGE LOCKED
Please enter the password to unlock the page

[Check password]

*FIG. 5B*

DEVICE INFO
- Type: 3dx
- Device ID: device_0
- Serial Number: 000000
- Firmware Version: 2021.04.6-1-8-g5b6f

SYSTEM CLOCK
- NTP
- PPS
- Time: 2:02:36 pm
- Date: 6/17/2021
- Timezone: America/New_York
- UTC
- [Sync Clocks]

SYSTEM STAUS
- Heartbeat
- Temp (C): 41
- Storage: 5%
- Capacity (MB): 14598
- Used (MB): 794

SAVE DATA
- Save Data
- Save Freq. (Hz): 1
- Data Rate (MB/s): 0
- File Name Prefix: 1
- [Delete All Data]

SYSTEM MESSAGES

Fetched device info numurus/3dx/device_0
Connected to rosbridge

SMART EDGE PLATFORM FOR EDGE DEVICES AND ASSOCIATED SYSTEMS AND METHODS

CROSS-REFERENCE TO RELATED APPLICATION(S)

The present application claims the benefit of U.S. Provisional Patent Application No. 63/223,924, filed Jul. 20, 2021, the entirety of which is incorporated herein by reference.

TECHNICAL FIELD

The present technology is generally directed to a smart edge platform and more specifically to a fully integrated platform with built in edge processing and data pipelines.

BACKGROUND

The industrial inspection market is rapidly moving from manual inspection operations to robotic inspection operations. The shift requires conventional human-operated sensor systems to be ported into robotic-supporting systems. Typically, the shift involves adding a number of new capabilities around a core sensor technology, integrating the sensor within a robotic system, and designing a platform that can support the sensor technology. In most cases, the creation of a robotic-supporting platform involves a laborious and time-consuming process of buying conventual, manually operated sensors and creating a custom platform from the ground up for each desired sensor capability and/or each desired control function. For example, the process can involve accumulating various desired imaging sensors (e.g., cameras, depth sensors, thermal imaging sensors, and the like), accumulating position and orientation sensors for each of the imaging sensors, and constructing a customized platform that compiles information from the imaging, position and orientation sensors. Then, the customized platform is integrated with a controller platform to adjust the position and orientation of the sensors and/or various components of a monitored environment.

BRIEF DESCRIPTION OF THE DRAWINGS

FIGS. 5B-5G illustrate examples of user interfaces hosted by the RUI web interface server and displayed on a user's network-accessible web browser of FIG. 5A in accordance with some implementations of the present technology.

Figure 1:
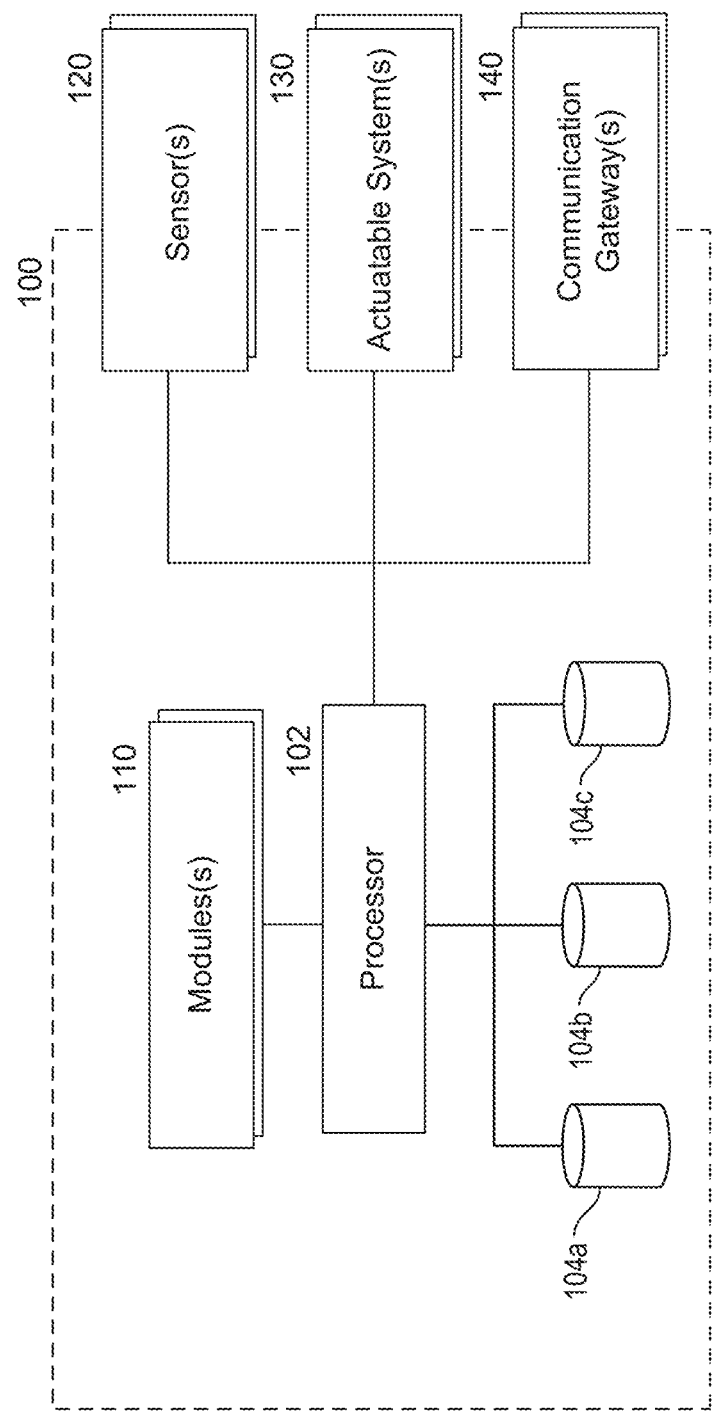
FIG. 1 is a schematic diagram of a smart edge platform in accordance with some implementations of the present technology.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

Overview

Constructing a functional smart edge system (e.g., an edge device) with an associated smart edge platform requires developers to integrate hardware and/or create modules that can perform onboard edge processing, synchronize sensor data with navigation information, provide onboard storage of data for post inspection analysis efforts, create a local system for human and/or robotic autonomous controls, and provide a remote connection to IoT devices and/or other systems for data and software management. The process can be time consuming, reducing the attention that can be dedicated to mission-specific applications of the smart edge system, the smart edge platform, and/or system developments around a deployed sensor. Further, the reuse of developed platforms can be limited due to incompatibilities between proprietary sensors, actuation components (e.g., actuators), communication components, robotic control systems and differences between interface and data formats for different manufacturers of components integrated into the platform. For example, a robotic solution developer might want to deploy a variety of different camera technologies (low-light sensors, infrared (IR) sensors, stereo sensors, and the like) on a robotic edge platform for different applications. Because each camera manufacturer may employ different data and control functionality and interfaces, switching out and/or adding new camera technologies can require extensive customization of various hardware interfaces and/or any software that interfaces with the selected camera such as user interfaces, AI processing software, or the robotic control system. For example, camera sensor manufacturers typically provide capabilities for saving video data. Each sensor manufacturer might support one of the many video file format standards used on the market today (e.g., MP4, MOV, WMV, AVI, AVCHD, FLV, F4V, SWF, MKV, WEBM, or HTML5). Unless the post-processing or analysis software supports each of the possible file formats, any non-supported data formats must first be converted to a supported format The necessary conversion can further make the processing and analysis automation difficult and time-consuming.

The inventors have realized that a typical smart edge platform requires one or more common sensor technologies (e.g., image sensors, orientation sensors, position sensors, local environment sensors, and the like), as well as common on-board capabilities (e.g., combining sensor data, locally processing sensor data, synchronization of data, AI detectors, and the like). Accordingly, the inventors have identified that a smart edge platform that provides standardized hardware interfaces for a range of typical sensors as well as a range of standardized and customizable processing functions can realize efficiencies in platform development. Further, a number of common capabilities can be built into the smart edge systems (e.g., position and orientation sensors) to avoid the need for downstream sensors to be integrated into the platform and to realize computational efficiencies with their use.

Smart edge systems, smart edge platforms, and associated systems and methods, that include features that, in part, solve the issues identified above are disclosed herein. In some implementations, the smart edge system includes standardized hardware interfaces that are abstracted into one or more platform interfaces and/or defined by common group types (e.g., common data and controls, image sensors, non-destructive testing sensors, etc.). Further, the smart edge platforms can reuse a standardized software backbone as sensors are swapped for other sensor types, upgraded, serviced, and/or otherwise varied, as well as across multiple smart sensors. In some implementations, the smart edge platform can include an onboard resident user interface (RUI) that includes a portal for connection through an internet browser, allowing users to connect to the RUI on the smart edge platform through any network accessible device (e.g., a mobile phones; smartphones; handheld devices; personal digital assistants (PDAs); tablets; notebooks, Ultrabooks and laptop computers; e-readers; all types of cameras; larger consumer electronic devices, such as desktop computers; wearable devices; and the like). The smart edge platform can also include an artificial intelligence (AI) and/or machine learning (ML) engine to turn raw sensor data into real-time automation and inspection information within the sensor in the local environment. As a result of the standardized sensor hardware connections and reusable smart edge platform, users of the smart edge system and/or the smart edge platform can focus on various application-specific components and/or functionalities of the smart edge system, the smart edge platform, and/or systems around the smart edge systems. For example, rather than directing attention to integrating sensors and updating the platform each time a sensor is varied, a user can focus on the development of robotic control systems associated with the smart edge systems based on the data they receive from the smart edge platform. In some implementations, the smart edge systems are integrated into (and/or with) one or more Internet of Things (IoT) devices. For example, the smart edge systems can include local communication devices to receive additional sensor data from local sensors and/or to communicate sensor data to a nearby device.

In various implementations, the smart edge platform can: include onboard edge processing pipelines that can shared across multiple and/or different physical sensors (either integrated into, or externally connected to the platform); allow the onboard edge processing pipelines to be reused and/or adapted across different sensors, different groups of sensors, different applications of the smart sensor platform, and/or different platforms altogether; apply various navigation systems and data to group data; provide control over various sensor groups to a central control system (human-in-the-loop and/or automated software); transmit data and controls over connected communication gateways (Wi-Fi, Acoustic, RF, Satellite, and the like); reuse IoT-connected displays and/or control services across specific sensors and/or actuator groups; and provide immediate access to data from a sensor group (e.g., without needing to convert data from one user, sensor, or manufacturer-specific format to another).

Additionally, or alternatively, the smart edge platform can address common needs and/or challenges of typical robotics-integrated sensor platforms by connecting the abstracted sensor and control interfaces with onboard functionalities. For example, the smart edge platform can include an edge processing management system that connects abstracted sensor data streams to one or more onboard processing routines. In some implementations, the onboard processing routines are real-time modules that are selectable from a stored library of routines. The smart edge platform can also include a navigation and pose management system that associates sensor data with orientation and position data. In various implementations, the orientation and position data can be fixed, from an onboard orientation and position sensor, and/or from an external source (e.g., from an external global positioning system (GPS) sensor). The smart edge platform can also include a storage system that stores time-synchronized sensor data, edge processing data, navigation data, orientation data, and/or system status data. In various implementations, the storage system can store the data at set intervals, based on one or more predefined externally or internally detected events, and/or continuously. The smart edge platform can also include a RUI that hosts an internet service allowing platform users to manage and/or monitor the smart edge system and/or the smart edge platform (and any connected systems) through an internet browser from any suitable remote electronic device (e.g., a user's a mobile phone; smartphone; handheld device; PDS; tablet; notebook, Ultrabook, and/or laptop computer; e-reader; desktop computer; wearable device; etc.). Because the smart edge platform is accessible through the internet browser, no special software needs to be installed to manage and/or monitor the smart edge platform. The smart edge platform can also include an IoT Interface allowing one or more remote devices to communicate, monitor, and/or control the smart edge system and/or the smart edge platform.

In some implementations, the smart edge platform includes an abstracted sensor driver that is connected to one or more internal and/or external sensors to receive sensor data and send sensor controls and is communicatively coupleable smart edge platform modules and interfaces, one or more communication component(s) that are communicatively coupleable to one or more external computing devices, at least one processor, and at least one memory. The residential user interface can be accessible to the user of one of the external computing device(s) via one of the communication component(s). The abstracted sensor driver communicates with the sensor(s) in a first format native to the sensor (internal or external); processes the sensor data, where the processing includes converting the sensor data from the first format to a second format; and forwards the processed sensor data to various other smart edge platform modules and interfaces (e.g., the residential user interface). In addition, the abstracted sensor driver can receive sensor controls in the second format native from smart edge platform modules and interfaces; process the controls, where processing includes converting the second format controls to the sensor's first native format; then forward the processed controls to the relevant sensor(s).

In some implementations, the smart edge platform further includes a plurality of integrated or external sensors and abstracted sensor drivers individually communicatively coupled to each of the plurality of the integrated or external sensors. In such implementations, the smart edge platform can receive the sensor data from any of the plurality of sensors in a format that is native to the corresponding sensor and process the sensor data. The processing can include converting the sensor data from the format native to the corresponding sensor to the second format (e.g., a native to the residential user interface). Once processed, the smart edge platform can send the processed sensor data from the corresponding sensor to various on-board processing modules, the residential user interface, a robotic control system, and/or a remote server. In various implementations, the plurality of sensors can include at least one of: a stereo three-dimensional ("3D") camera, a 3D sonar scanner, a color camera, a thermal imaging device, and/or a global positioning system component. In some implementations, the plurality of sensors include a navigation and position sensors (sometimes referred to herein as a "NavPose sensor"). In such implementations, the smart edge platform can, using information from the NavPose sensors, determine a geographic location of the smart edge platform, geotag the processed sensor data, properly position three-dimension data in space, plan a route to a destination, and/or measure a distance traveled by the smart edge platform.

In some implementations, processing the sensor data includes at least one of: data filtering, noise reduction, data fusion, artificial intelligence-based and/or machine learning-based detection, target ranging and tracking, and/or data compression. Additionally, or alternatively, processing the sensor data can include applying an event detection module to the sensor data and/or the processed sensor data to determine whether the sensor data indicates an occurrence of a predetermined event.

In some implementations, the smart edge platform includes one or more integrated or externally interfaced actuatable (e.g., movable, robotic, and the like) components that can be controlled by the smart edge platform. For example, the actuatable components can include a translator motor, a pan motor, a tilt motor, a propeller, a propulsion jet, and/or a robotic arm. In such implementations, the smart edge platform can instantiate a robotic system interface, a local user interface, and/or a remote operations interface to receive one or more input commands to action the one or more actuatable components and control the one or more actuatable components in accordance with the inputs. Additionally, or alternatively, the robotic system interface, the local user interface, and/or the remote operations interface can provide actuator state information.

In some implementations, the smart edge platform includes one or more sensor drivers, one or more actuatable system drivers, and an edge software component communicatively coupled between the one or more sensor drivers and the one or more actuatable system drivers. Each of the one or more sensor drivers can be communicatively coupled to an integrated sensor and/or an external sensor. Similarly, each of the one or more actuatable system drivers can be communicatively coupled to an actuatable component, a communication component, and/or a robotic component at the smart edge platform. In such implementations, the edge software component can include one or more sensor modules that are each configured to: receive sensor data and transmit sensor controls in a format native to the sensors and convert the sensor data into a second format usable downstream from the one or more sensor modules. The edge software component can also include an edge processing module that is communicatively coupled to abstracted sensor drivers to receive and process the converted sensor data. Additionally, or alternatively, the edge software component can include a residential user interface, event management module, a connected robotic control system, and/or an IoT interface module that is communicatively coupled to the edge processing module and/or the sensor module(s). The residential user interface can be configured to provide a network-accessible interface (e.g., through a web browser) to the sensor data (processed or unprocessed) without a user downloading software specific to the sensors on the smart edge platform.

In some implementations, the smart edge platform includes one or more integrated or externally interfaced communication gateway hardware components (e.g., cellular modems, satellite modems, acoustic modems, laser modems, radio frequency (RF) modems, and the like) that can be controlled by the smart edge platform. For example, the abstracted communications driver can communicate with the communication gateway hardware in a first format native to the communication gateway hardware; process any communications data received therefrom, where the processing includes converting the communications data from a format native to the communication gateway hardware to a format native to the smart edge platform; and forward the processed communications data to/from smart edge platform modules and interfaces (e.g., the residential user interface).

In some implementations, the one or more abstracted communication drivers components of the smart edge platform are communicatively coupleable to a remote server. In such implementations, the smart edge platform can instantiate two-way messaging with the remote server, two-way transfer of data with the remote server, receive system configuration and software updates from the remote server. A remote operations interface can then provide remote operators smart edge device coupleable display widgets, control widgets, data management tools, data post-processing tools, AI training tools, and smart sensor configuration and software updating tools. By providing a capability and means to update new software modules from the remote server- and install the processing module, the smart edge platform can accommodate new external sensors in an ad-hoc manner, install updates that improve the accuracy of the sensor data, and/or install updates that provide additional functionality to the smart edge platform using the sensor data.

In some implementations, the edge software component also includes an event detection module that is communicatively coupled to the sensor module(s). The event detection module can support a library of event scripts, each capable of being enabled/disabled as needed and configured to determine, based on the sensor module data, processing module data, navigation and pose module data, user inputs, and/or robotic control system inputs, whether a predetermined event has occurred. In some such implementations, the edge software component also includes a navigation and position module (sometimes referred to herein as a "Nav-Pose module") that is communicatively coupled to the event detection module. When the event detection module determines that the predetermined event has occurred, the event detection module can save event data; command data saving in various other system modules; send control commands to sensor, processing, and actuation modules; adjust system module configurations; and/or communicate the occurrence to a residential user interface, connected robotic control system, or IoT interface module, or send a command to a local control system. In some implementations, the NavPose module then controls a navigation and position system (sometimes referred to herein as a "NavPose system") integrated with (or coupled to) the smart edge system through the or more system driver(s). Additionally, or alternatively, the edge software component can include an actuation module that is communicatively coupled to the event detection module. When the event detection module determines the predetermined event has occurred, the event detection module communicates the occurrence to the actuation module. The actuation module can then control one or more actuatable components integrated with (or coupled to) the smart edge system through the system driver(s). Additionally, or alternatively, the event detection module can be communicatively coupled to the edge processing module. When the event detection module determines the predetermined event has an occurred, the event detection module communicates the occurrence to the edge processing module. The edge processing module can then perform additional processing of the sensor data based on (or in view of) the occurrence.

In some implementations, the edge software component can instantiate and/or control a robotic system interface that is operatively coupled to the actuatable system driver(s). In such implementations, the robotic system interface can provide a network-accessible interface that allows a user (local or remote) to control one or more robotic components that communicatively coupled to the smart edge platform.

In some implementations, the edge software component can instantiate and/or control a resident user interface that is operably coupled to the system's sensors, actuatable systems, modules, and interfaces. In such implementations, the edge software component can, using a resident user interface, send and display sensor, actuator, and module processed data to human users through a network-connected web browser-enabled device and/or receive updates related to the edge software components. For example, a human user could open a web browser on a network-connected device (e.g., laptop, smartphone, and the like), select and enable an AI model in an AI module, monitor the AI output data real-time, and make any AI model setting adjustments required to improve performance.

In some implementations, the edge software component can instantiate and/or control a remote operations interface that is operably coupled to the system's sensors, actuatable systems, modules, and interfaces. In such implementations, the edge software component can, using the remote operations interface, send sensor, actuator, and module processed data to an external computing device and/or receive updates related to the edge software components. For example, the updates can include additional processing modules for processing the converted sensor data; updates to one or more sensor modules; and/or updates to an event detection module on the edge software component.

In some implementations, the smart edge platform can make use of various artificial intelligence and/or machine learning algorithms to improve the operation of the smart edge platform (e.g., increase the accuracy and/or efficiency of the sensors and/or the processors; create new processing modules; and the like). A method for employing the artificial intelligence and/or machine learning algorithms can include deploying the smart edge platform in a smart sensing or robotic system; collecting sensor data from the individual sensors in the smart edge system; training an artificial intelligence model on the sensor data to identify at least one of (1) updates to the operation of individual sensors and (2) updates to the processing of the sensor data; generating software updates to the edge software component based on the identified updates to the operation of the individual sensors and/or the updates to the processing of the sensor data; and deploying the software updates to the edge software component in the smart edge platform. In some implementations, the method can be executed by an onboard artificial intelligence and/or machine learning module. In some implementations, the edge software component uses a remote operations interface that is communicatively coupleable to a remote computing device to execute the artificial intelligence and/or machine learning methods. For example, the artificial intelligence and/or machine learning process discussed above can be executed at the remote server, then the updates to the edge software component can be sent to the edge software component through the remote operations interface.

For ease of reference, the platform and various hardware examples are sometimes described herein with reference to top and bottom, upper and lower, upwards and downwards, and/or horizontal plane, x-y plane, vertical, or z-direction relative to the spatial orientation of the implementations shown in the figures. It is to be understood, however, that the platforms and hardware examples can be moved to, and used in, different spatial orientations without changing the structure and/or function of the disclosed implementations of the present technology.

DESCRIPTION OF THE FIGURES

FIG. 1 is a schematic diagram of a platform 100 for use in a smart sensor in accordance with some implementations of the present technology. In the illustrated implementation, the platform 100 includes a processor 102 that is connected to databases 104*a*-104*c*. The processor 102 can be a single processing unit or multiple processing units in a device. The platform 100 also includes one or more computer executable modules 110. Purely by way of example, the module(s) 110 can include an edge processing module configured to receive, link, and/or process incoming sensor data; or a navigation and position module (sometimes referred to herein as a "NavPose module") configured to control the position, orientation, and movement of the hardware components of the platform 100 and/or a robotics environment connected to the platform 100. Additional details and examples of the modules are discussed below with respect to FIGS. 3-10. As further illustrated in FIG. 1, the platform 100 can include one or more sensors 120, one or more actuatable systems 130, and one or more communication gateways 140. The sensor(s) 120, the actuatable system(s) 130, and the communication gateway(s) 140 can each be integrated into the hardware of the platform 100 and/or externally. The platform 100 can include standardized hardware connections for each of the externally connected sensor(s) 120, actuatable system(s) 130, and/or communication gateway(s) 140, allowing the sensor(s) 120, actuatable system(s) 130, and/or communication gateway(s) 140 to be quickly connected and disconnected to be swapped, repaired, updated, and/or otherwise varied.

The processor 102 can be configured to execute one more computer-readable program instructions, such as program instructions to carry out operations of any of the module(s) 110, for example as described in more detail below. In some implementations, the processor 102 is configured to transmit data (e.g., sensor data, position and orientation data, control data, data resulting from an AI or ML component, etc.) via the communication gateways 140 to one or more remote device(s) located outside the patient's body (e.g., a networked server, computing device, Internet of Things (IoT) networked device, virtual AI assistant, other smart edge platforms, etc.).

In various implementations, the sensor(s) 120 can include one or more two-dimensional (2D) and/or three-dimensional (3D) imaging sensors (e.g., a visible light camera, a sonar device, a light detection and ranging (Lidar) sensor, a thermal imaging sensor (e.g., infrared cameras), hyperspectral image sensors, and the like), position and/or orientation sensors, environmental condition sensors (e.g., to measure ambient temperature, atmospheric pressure, and the like), nondestructive test (NDT) sensors (e.g. Visual, Ultrasonic, Radiography, Eddy Current, Magnetic Particle, Acoustic Emission, Liquid Penetrant, Leak Testing), and/or any other suitable sensor. The actuatable system(s) 130 can include electrical-mechanical systems (e.g., motors, actuators, pan and tilt components, robotic components, and the like) to control the orientation, position, and movement of the platform 100 or connected localization and pose systems (e.g., GPSs, inertial navigation systems, acoustic localization systems, image-based simultaneous localization and mapping systems, celestial navigation systems and the like). The communication gateway(s) 140 can include network (e.g., Ethernet) communication components, short-range wireless components (e.g., Wi-Fi, Radio Frequency, Cellular, Bluetooth, Acoustic), long-range wireless components (e.g., lasers and satellite communication components), and the like.

Figure 2:
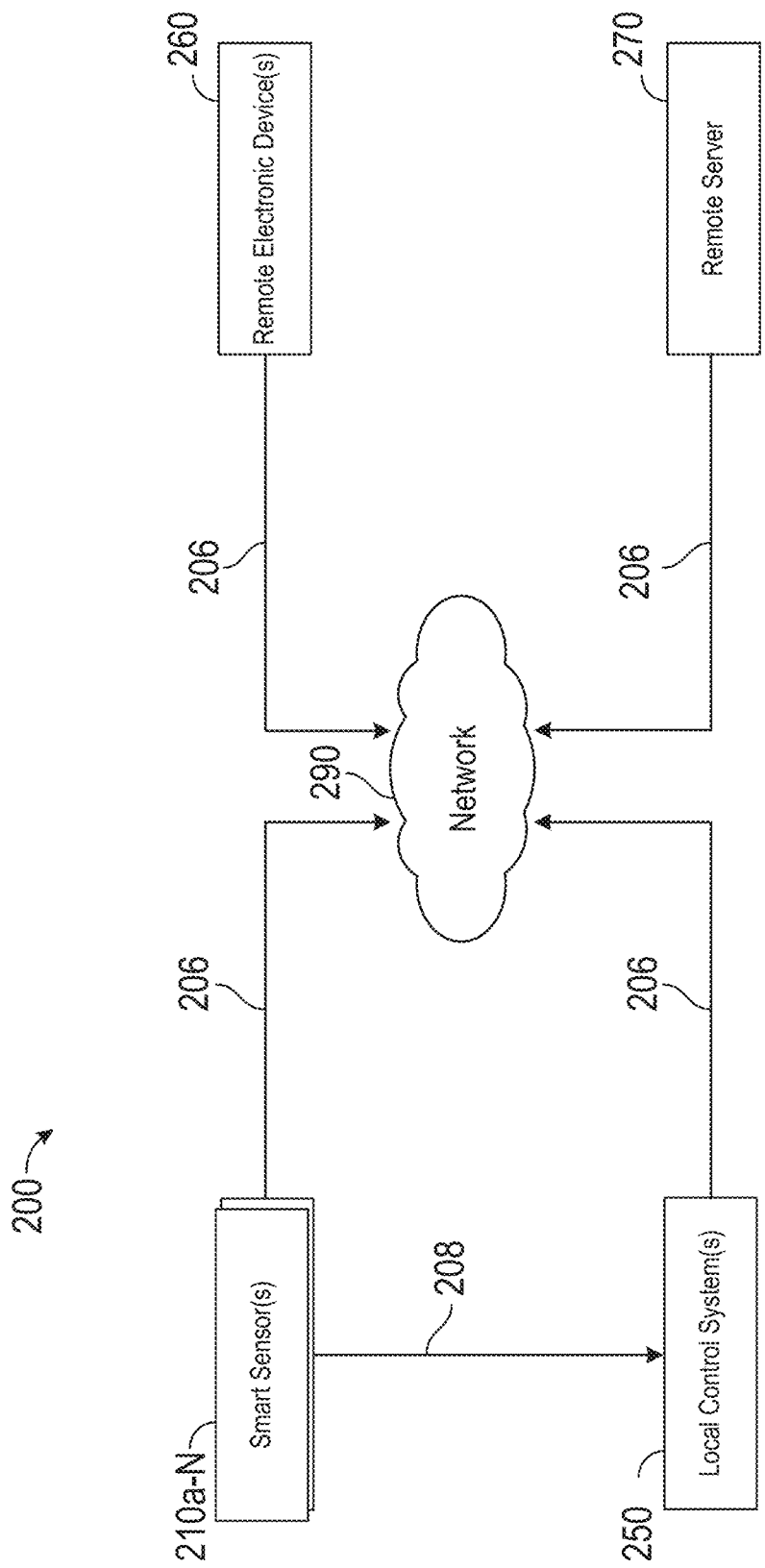
FIG. 2 is a network diagram of a system of smart sensor in accordance with some implementations of the present technology.

FIG. 2 is a network diagram of a system 200 in accordance with some implementations of the present technology. As illustrated in FIG. 2, the system 200 can include any suitable number of smart sensors 210a-N that communicate with a network 290 via communication lines 206 and one or more local control systems 250 (e.g., a local automated and/or robotic control system) through communication local communication lines 208 (e.g., short-range wireless, a wired connection, and the like). In some implementations, the local control system is implemented on the smart edge system's own processor. The smart sensors 210a-N can communicate with the network 290 to relay data from one or more connected sensors, provide a network-based portal to an on-board resident user interface (RUI), transmit data through a remote operations portal, receive software updates and/or control signals through the remote operations portal, and the like. The smart sensors 210a-N can communicate with the local control system(s) 250 to provide access to the smart sensor data, control the smart sensors 210a-N, and/or exercise local control over the local control system(s) 250. For example, the smart sensors 210a-N can command a local robotic arm to adjust an external system that is monitored by the smart sensors 210a-N. The control can be based on, for example, determinations from a module (e.g., an AI/ML module) in the smart sensors 210a-N and/or indications from an external source (e.g., a user of the internet-based portal).

As further illustrated in FIG. 2, the system 200 can also include one or more remote electronic devices 260 (e.g., mobile phones; smartphones; handheld devices; PDAs; tablets; notebooks, Ultrabooks and laptop computers; e-readers; all types of cameras; larger consumer electronic devices, such as desktop computers; wearable devices; and the like) and a remote server 270. Each of the remote electronic device(s) 260 and the remote server 270 also communicate with the network 290 via communication lines 206 for various purposes. For example, the remote electronic device(s) 260 can communicate with the smart sensors 210a-N via the network 290 to access the internet-based portal to the RUI. The network-based access to the RUI thereby provides a user of the remote electronic device(s) 260 with remote access to any modules on the smart sensors 210a-N without needing to download and run any specialized software. Accordingly, the system 200 increases the flexibility of access and control over the smart sensors 210a-N. The remote server 270 can communicate with the smart sensors 210a-N via the network through an accessible communications gateway between the smart edge system and the remote server 290 to receive and store the data from the sensors, push updates to the smart sensors 210a-N, and/or any other suitable purpose.

Figure 3:
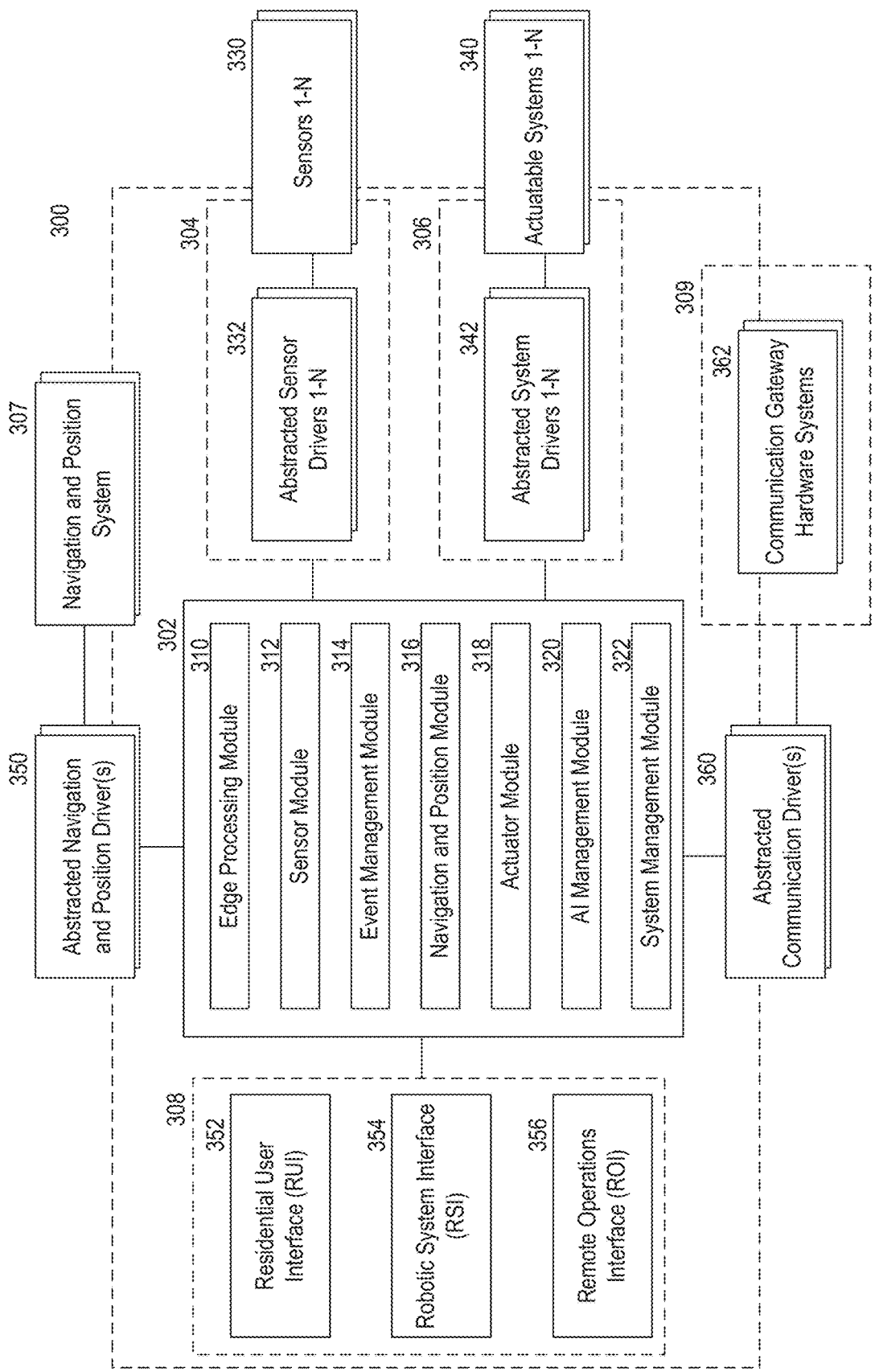
FIG. 3 is a schematic diagram of a smart edge platform in accordance with some implementations of the present technology.

FIG. 3 is schematic diagram of a smart edge platform 300 for use in a smart sensor in accordance with some implementations of the present technology. A processor and/or a storage component are not illustrated in FIG. 3 to avoid obscuring the illustrated components of the platform 300. However, one of skill in the art will understand that, like the platform 100 discussed above with respect to FIG. 1, the platform 300 can include one or more processors and any suitable number of storage components. As illustrated in FIG. 3, the platform 300 can also include an edge software system 302 with one or more modules (seven shown), a sensor system 304, a control system 306, a navigation and position system 307 ("sometimes referred to as a "NavPose system"), a communications system 309, and an interface system 308.

In the illustrated implementation, the edge software system 302 includes an edge processing module 310, a sensor module 312, an event management module 314, a navigation and position module 316 ("NavPose module 316"), an actuation module 318, an AI management module 320, and a system management module 322, each of which is discussed in more detail below. As also discussed in more detail below, during operation of the smart edge platform 300, the edge software system 302 can receive and send signals from/to the sensor system 304, the control system 306, the NavPose system 307 the communications system 309, and the interface system 308. For example, the edge software system 302 can receive sensor signals from the sensor system 304, process the sensor signals, and communicate information related to the sensor signals through the interface system 308 and/or control local actuators through the control system 306 based on the processed sensor signals. In another example, the edge software system 302 can receive an update for one or more of the modules (e.g., the edge processing module 310) from a remote computer and install the update.

In various implementations, the edge software system 302 can include various additional (or fewer) modules related to the control of the platform 300 and/or the flow and processing of sensor signals therethrough. Purely by way of example, the edge software system 302 can include processing modules specific to various detectable events and/or various submodules within the edge processing module 310 (e.g., related to alternative processing modules, modules only executed during a detected event, and the like).

The sensor system 304 includes one or more abstracted sensor drivers 332 that are coupled and/or coupleable to one or more sensor-integrated and/or externally connected sensors 330 to the platform 300. Purely by way of example, the sensor(s) 330 in the sensor system 304 can include locally integrated position, orientation, and environmental sensors as well as various externally connected, application-specific sensors. The locally integrated sensors can provide data that is relevant to most implementations of the platform 300. In contrast, the externally connected sensors can be varied according to a specific implementation. Purely by way of example, the externally connected sensors can include various flow meters, temperature sensors, 3D imaging sensors, imaging sensors, force sensors, pressure sensors, sound sensors, current and/or voltage sensors, chemical sensors, and the like. Further, because the externally connected sensors are connected to the platform 300 through the abstracted sensor driver(s) 332, the externally connected sensors can be readily varied by an end user, without additional customization of the hardware components and/or modules of the platform 300 to accommodate the sensors. In addition, as discussed in more detail below, the edge software system 302 can receive updates to one or more of the abstracted sensor drivers to accommodate the sensors 330 in a plug-and-play manner. For example, the edge software system 302 can receive updates to the sensor system 304 and/or sensor module 312 (e.g., delivered through the interface system 308) that allows the platform 300 to operate a new external sensor and/or process the sensor data in a new way and/or to connect to a newly added sensor.

Similarly, the actuatable system 306 includes one or more abstracted actuatable system drivers 342 that connect one or more actuatable systems 340 ("movable system(s) 340") to the platform 300. The movable system(s) 340 can include components that adjust the position, orientation, and/or movement of some physical object that includes the platform 300, actuation components related to automated tasks (e.g., robotic arms, payload delivery, and the like), and/or other controllable moving components. In some implementations, for example, the movable system(s) 340 include complete external systems for remote performance of any suitable function (e.g., underwater inspection and maintenance of a pipeline, remote field surveillance, etc.). Similar to the discussion above, because any externally connected movable systems are connected to the platform 300 through the abstracted actuatable system driver(s) 342, the platform 300 does not require additional customization of the hardware components or system modules to accommodate the externally connected movable systems. In addition, as discussed in more detail below, the edge software system 302 can receive updates to one or more of the abstracted actuatable system drivers to accommodate external actuatable systems in a plug-and-play manner. For example, the edge software system 302 can receive updates to the actuatable system 306 and/or actuation module 312 (e.g., delivered through the interface system 308) that allow the platform 300 to operate a new external actuatable system and/or control the actuatable system in a new way and/or to operate newly connected actuatable systems.

Similarly, the NavPose system 307 includes one or more abstracted NavPose drivers 350 that connect one or more navigation and position components 352 to the platform 300. The navigation and Position components 352 can include components that provide estimation of the navigation and pose estimation systems navigation and/or pose to the smart edge platform 300 (e.g., a GPSs, compasses, inertial measurement units, inertial navigation systems, acoustic localization systems, image-based simultaneous localization and mapping systems, mechanical positioning systems, celestial navigation systems and the like). Similar to the discussion above, because any externally connected localization or pose estimation systems are connected to the platform 300 through the abstracted NavPose driver(s) 350, the platform 300 does not require additional customization of the hardware components or system modules to accommodate the externally connected navigation and position components(s). In addition, the smart edge platform 300 can receive updates to one or more of the abstracted NavPose drivers 350 to accommodate externally connected localization and pose estimation systems in a plug-and-play manner. For example, the edge software system 302 can receive updates to the NavPose system 307 that allow the platform 300 to operate a new external localization and position component 352.

Similarly, the communications system 309 includes one or more abstracted communication drivers 360 that connects one or more communication gateway hardware systems 362 to the platform 300. The communication gateway hardware systems 362 can include components that provide communications between the smart edge platform 300 and a remote server or network (e.g., ethernet, wireless network (e.g., WiFi, serial, cellular, satellite, short-wave short-range wireless (e.g., Bluetooth®), laser, acoustic, and the like). Similar to the discussion above, because any externally connected communication gateway hardware is connected to the platform 300 through the abstracted communications driver(s) 360, the platform 300 does not require additional customization of the hardware components or system modules to accommodate the externally connected communications gateway hardware. In addition, the smart edge platform 300 can receive updates to one or more of the abstracted communications drivers to accommodate externally connected communications gateway hardware in a plug-and-play manner. For example, the edge software system 302 can receive updates to the communications system 309 that allow the platform 300 to operate a new component of the external communications gateway hardware system 362.

The interface system 308 allows the platform 300 to communicate with and/or control various external systems. In the illustrated implementation, the interface system 308 includes a residential user interface 352 ("RUT 352"), a robotic system interface ("RSI 354") and a remote operations interface 356 ("ROI 356"), each of which can be instantiated, administered, updated, closed as necessary to communicate information from the platform 300 while conserving resources at the platform 300.

The RUI 352 provides a network-connected computing device with access to information, system controls, and system configuration settings on the platform 300 (e.g., to receive and display raw and/or processed sensor data, control one or more sensor operational parameters, sett location and orientation data sources, configure system network and communication settings, and the like). Further, the RUI 352 can provide the remote access to information and controls without requiring the remote computing device to download software specific to any of the sensors and/or information. For example, the RUI 352 can publish the information from the platform 300 through a web-based browser. As a result, any networked device (with any relevant credentials) can access the information through the RUI 352. The RUI 352 uses a protocol bridge to translate data and controls between the protocols native to the platform 300 and common web protocols, such as HyperText Markup Language (HTML) and JavaScript Object Notation (JSON). The RUI 352 can be communicatively and/or operatively coupled to any of the modules in the edge software system 302. For example, the RUI 352 can be controlled (e.g., instantiated, administered, updated, closed, and the like) by the system management module 322 (or another suitable module). Additionally, or alternatively, the RUI 352 can be communicatively coupled to the edge processing module 310 to receive and publish processed sensor data. Additionally, or alternatively, the RUI 352 can be operatively coupled to the sensor module 312 to control one or more of the sensors 330 (e.g., to take a measurement in response to receiving an input from the network-connected computing device).

The RSI 354 provides a network-connected robotic control system with access to data, controls, and configuration of any system sensors 304, actuatable systems 306, modules 302, or interfaces 308 without requiring the robotic control system to install platform-specific interface software, thereby providing plug-and-play integration. For example, the RSI 354 can allow a network-connected robotic control system access to a smart edge system's integrated sensor 304 or actuatable system 306 data and controls (e.g., access an integrated camera's raw data or control drivable components such as motors, turbines, rotors, and the like). In another example, the RSI 354 can allow a network-connected robotic control system to receive data from the smart edge system's sensor, processing, and/or event modules 310, 312, 314, and/or send data through the smart edge system's remote operations interface 356.

The ROI 356 provides a bridge between various modules of the edge software manager 302 and a remote server to support the Internet of Things (IoT) configuration of the platform 300 (e.g., to support remote data transfer and software management with a remote server). For example, the ROI 356 can provide various hardware-level bridges over a variety of communication gateways (e.g., ethernet, wireless network (e.g., WiFi), serial, cellular, satellite, shortwave short-range wireless (e.g., Bluetooth®), laser, acoustic, and the like) to communicate information from the platform 300 (e.g., sensor and processing data) to a remote server, receive updates to a configuration of the platform 300, receive updates to software on the platform 300, and the like.

Figure 4:
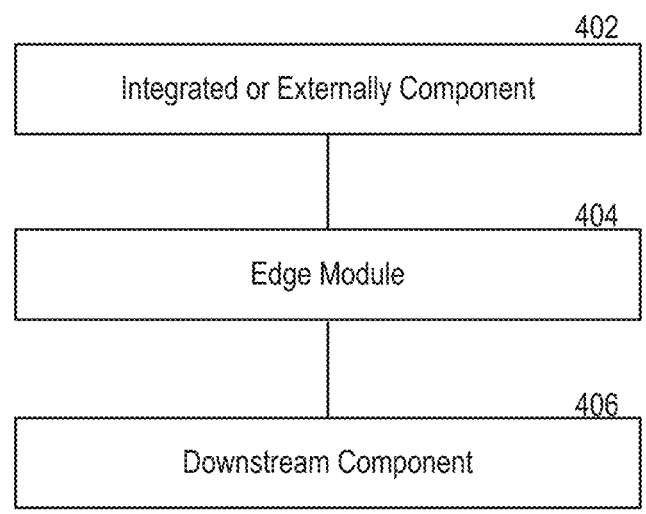
FIG. 4 is a schematic diagram of the flow of information through various modules of a smart edge platform in accordance with some implementations of the present technology.

FIG. 4 is a schematic diagram of the flow of information through various modules of a smart edge platform (e.g., the platform 300 of FIG. 3) in accordance with some implementations of the present technology. More specifically, FIG. 4 illustrates the flow of information through various sensor modules, system management module, edge processing modules, event management modules, NavPose module, and/or actuation modules, each of which can be incorporated into the edge software system 302 of FIG. 3. As illustrated, an edge module 404 (e.g., any of the modules described above) can consume information provided by an integrated or externally connected component 402 (e.g., smart edge platform drivers, modules, interfaces, and the like) and provide new information to a downstream component 406 (e.g., integrated smart edge platform drivers, edge modules, interfaces, and the like), using a publish and subscription communication protocol. As an example, a sensor module might take in 2D sonar data and NavPose data from available sensor and NavPose system drivers and produce new 3D geopositioned sonar data. The new 3D geopositioned sonar data can then be published on a residential user interface for viewing on a remote web browser. Additionally, or alternatively, the edge module 404 can adjust settings on the integrated or externally connected component 402 and/or the downstream component 406 (e.g., adjusting settings on other smart edge platform drivers, modules, interfaces, and the like). For example, an event module might consume data from a camera sensor system driver, detect high water turbidity, and adjust settings on an image enhancement edge processing module.

In a specific, non-limiting example, the edge module 404 can be a smart sensor module that receives information (e.g., unprocessed sensor data) from an integrated or externally connected sensor. The edge module 404 can then reformat the data from a format native to sensor to a second format usable downstream from the edge module 404 (e.g., in other edge modules, interfaces, and the like). Once reformatted, the edge module 404 can direct the data to the downstream component 406 (e.g., another module in the smart sensor platform, an RUI, an RSI, an ROI, and the like). Additionally, or alternatively, the edge module 404 can receive information from the downstream component 406 (e.g., control signals); reformat the information from a format native to the downstream component to a format native to the sensor; and forward the information to the sensor. That is, the edge module 404 provides a common abstracted pathway between the sensor and the downstream component 406, thereby enabling the flow of information between the two.

In various implementations, the sensor can include image sensors (e.g., CMOS sensors, 3D sensors, LIDAR sensors, etc.), orientation sensors, position sensors, local environment sensors (e.g., temperature sensors, flow rate sensors, pressure sensors, etc.), and the like. Varying sensor types can be based on varying native formats. Instead of requiring hardware updates to handle the varying formats, however, the edge module 404 can accommodate the varying formats, thereby providing an abstracted pathway that allows sensors to be added as required. When a new sensor is added, the edge module 404 can connect to the sensor and/or be updated if needed to connect to the sensor. Once connected, as discussed above, the edge module 404 can provide information from the downstream component 406 to the sensor. The information can include configuration options such as enabling/disabling one or more sensors, setting sensor rates, ranges, angles, resolutions, and intensities, and the like.

In another specific, non-limiting example, the edge module 404 can receive information from another onboard module then process the information. In various implementations, the processing can include making one or more determinations (e.g., artificial intelligence-driven detections, target ranging and tracking, and the like), compressing the information, filtering the information, and the like. For example, the edge module 404 can receive sensor data in a common format from a sensor module, then process the sensor data by applying one or more filters and/or compression algorithms to the sensor data. The edge module 404 can then send the processed information to the downstream component 406 (e.g., another module in the smart sensor platform, an RUI, an RSI, an ROI, and the like). For example, the edge module 404 can make the processed sensor data available to the RUI 352 (FIG. 3) to provide access to the sensor data to a remote computing device. The edge module 404 can support a real-time communication of processed information (e.g., sensor data) between the onboard module and the downstream component 406.

Additionally, or alternatively, the edge module 404 can receive information from the downstream component 406 (e.g., control signals related to the edge processing) and update operation of the smart sensor platform accordingly. For example, the updates can include enabling/disabling processing functions, installing new processing functions, data input selection, signal processing selection, filter selection, AI model selection, process settings, and the like. The updates can affect the output of information into the downstream component 406, the resources required by the edge module 404, and/or the range of sensor data the edge module 404 is able to handle. As a result, the edge module 404 can allow a remote computing device (e.g., through the RUI 352 of FIG. 3) to update the operation of the smart edge platform as desired.

In another specific, non-limiting example, the edge module 404 can receive information from a system resource. The system resource can include a hardware component (e.g., processor hardware, storage media hardware, communications hardware, power monitoring hardware, temperature monitoring hardware, and the like), one or more of the modules, various other firmware, one of the sensors, and the like. The edge module 404 can then process the information and, if necessary, send control information to the downstream component 406. Purely by way of example, the edge module 404 can process the information from a hardware component and determine whether to update a status of the hardware component on the RUI. That is, the edge module 404 can provide a common abstracted pathway between the system resource and the downstream component 406. Additionally, or alternatively, the edge module 404 can receive information from the downstream component 406 (e.g., control signals to enable/disable onboard resources, adjust system performance, adjust communication settings, and the like) and update operation of the smart edge platform accordingly. As a result, the edge module 404 can allow a remote computing device (e.g., through the RUI 352 of FIG. 3) to update the operation of the smart sensor platform as desired.

In yet another specific, non-limiting example, the edge module 404 can receive information from an onboard module (e.g., from the sensor module, from the edge processing module, and the like) and process information to perform various event detection functions (e.g., location-based events, data-based based events, processing-based events, system-based events, combinations of such, and the like). For example, the edge module 404 can receive information related to a location of the smart edge platform (e.g., from the NavPose module 316 of FIG. 3) and detect when the smart edge platform reaches a target destination, exits a geofenced area, deviates from a planned route by more than a predetermined amount, and the like. In another example, the edge module 404 can receive sensor data (processed or unprocessed) and detect the occurrence of an event based on the sensor data (e.g., to detect a rupture in a pipeline based on measured flow rates, image data, pressure data, and the like).

When an event is detected, the edge module 404 can send information to the downstream component 406. The information can include control signals that adjust operation of the smart edge platform (e.g., enabling/disabling modules, adjusting module settings, and the like) and/or sensors coupled thereto (e.g., controlling the sensors to perform one or more specific measurements in response to the event). Purely by way of example, when an event is detected, the edge module 404 can send control signals to the sensor module with instructions for performing one or more measurements to record additional data. Additionally, or alternatively, the information can include data related to the event and/or a report on the occurrence of the event. Purely by way of example, when an event is detected, the edge module 404 can send an indication of the event, and any related data, to the RUI to communicate the event to a remote computing device.

In yet another specific, non-limiting example, the edge module 404 can receive information from a navigation and/or position component ("NavPos component," such as a GPSs, compasses, inertial measurement units, inertial navigation systems, acoustic localization systems, image-based simultaneous localization and mapping systems, mechanical positioning systems, and the like); reformat the data from a format native to the NavPos component to a second format usable downstream; and send the reformatted information to the downstream component 406. For example, the edge module 404 can receive data from an onboard GPS component, format the GPS data as suitable for the onboard RUI, and send the GPS data to the RUI to be accessed by a remote computing device. In another example, the edge module 404 can transform image data based on a determined orientation of the smart sensor platform before the data is viewed and/or used by another component of the smart sensor platform (e.g., viewed by a user in the RUI). In another example, the edge module 404 can receive the GPS data format the GPS data to be appended to other sensor data, and send the GPS data to another module to be appended. As a result, the navigation and position module 444 can provide an abstracted bridge between the NavPos component and the downstream component 406.

Additionally, or alternatively, the edge module 404 can receive information from the downstream component 406 (e.g., control signals, updates to operation of the NavPos component, and the like) and update operation of the smart sensor platform accordingly. Purely by way of example, the information from the downstream component 406 can include enabling/disabling the NavPos component (e.g., turning a GPS on and off), setting sample rates for the NavPos component, and the like. In another example, the information from the downstream component 406 can include updates to how the edge module 404 acts on information received from the NavPos component (e.g., updates to processing the information, updates to automatic responses to the information, and the like).

In yet another specific, non-limiting example, the edge module 404 can provide an abstracted bridge between an actuation component and the downstream component 406. For example, the edge module 404 can allow the actuation component to send and receive information in a format native to the actuation component, while an onboard RSI sends and receives information in a format native to the onboard RSI. As a result, for example, a user of a remote computing device can access the onboard RSI (e.g., through a web-based browser) and control the actuation component without needing to install any software specific to the actuation component. In another example, the edge module 404 can allow a navigation and position module to control the actuation component (e.g., a motor) to impact the position and/or orientation of the smart edge platform.

In various implementations, the actuation component can include translator motors, pan motors, tilt motors, propellers, jets, robotic arms, doors, actuatable containers, and the like. In some implementations, the actuation component is an externally connected component coupled to the smart sensor platform through an abstracted driver (e.g., the abstracted system drivers 342 of FIG. 3). In such implementations, the edge module 404 can provide a software-based bridge to a new component, rather than requiring additional hardware and/or customization of the smart sensor platform. In some implementations, the actuation component is incorporated into the smart sensor platform.

In addition to providing an abstracted bridge between the actuation component and the downstream component 406, the edge module 404 can receive and store information from the downstream component 406 related to controlling the actuation component. For example, the edge module 404 can receive information related to enabling/disabling the actuation component (e.g., disabling a motor for a period), setting actuation rates (e.g., automatically actuating a component every five minutes, every ten minutes, every thirty minutes, and the like), setting sample rates to check for commands, setting automatic responses to information (e.g., such that when the event management module detects an event, the actuation component can be automatically controlled in response to the event), and the like.

Figure 5A:
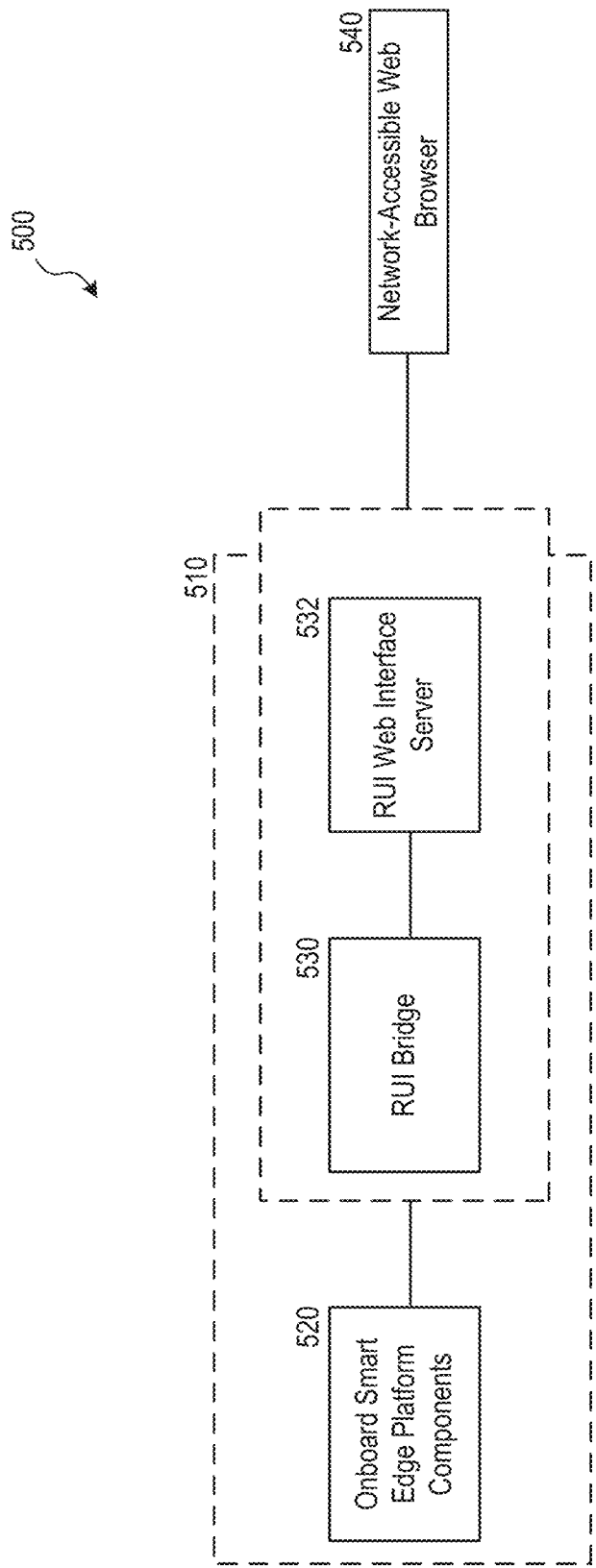
FIG. 5A is a schematic diagram illustrating aspects of a residential user interface on a smart edge platform in accordance with some implementations of the present technology.
Figure 5D:
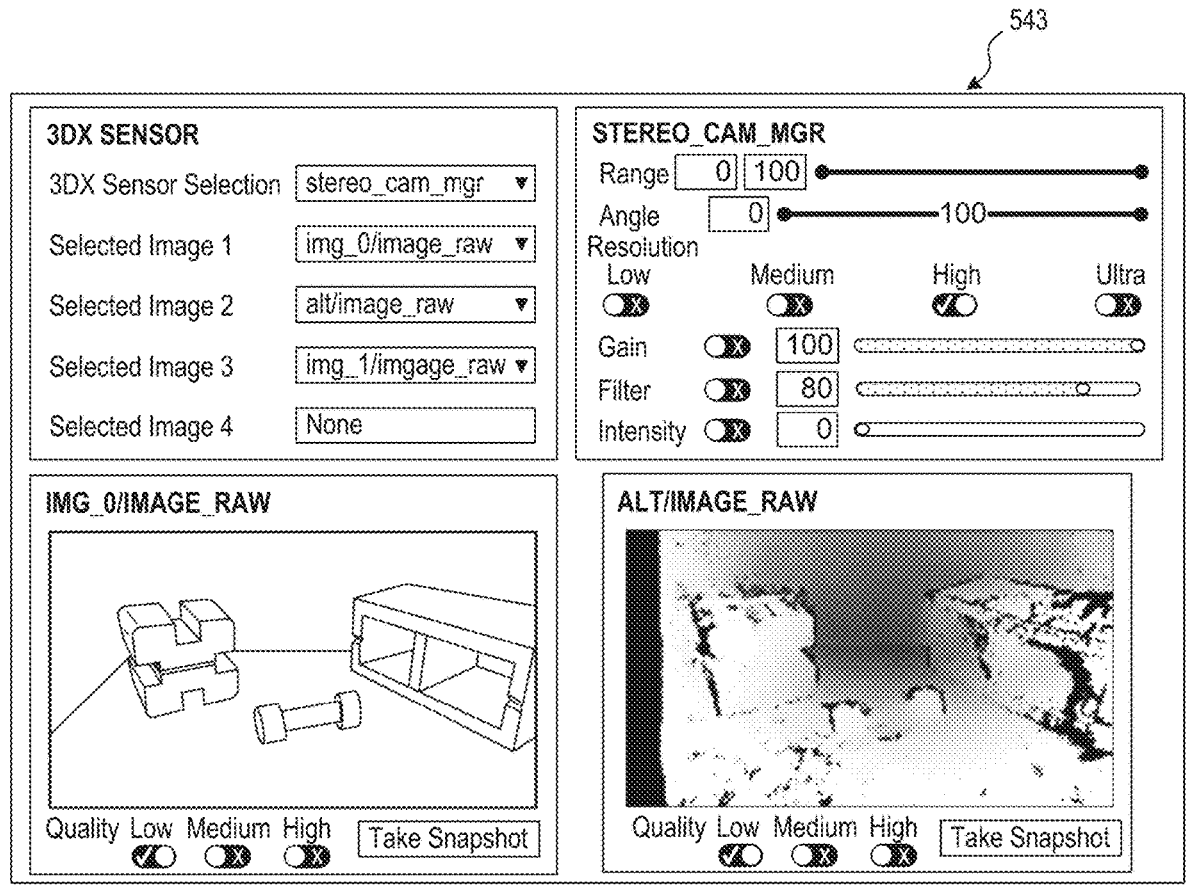

FIGS. 5A and 5B are schematic diagram illustrating aspects of a RUI 510 on a smart edge platform 500 in accordance with some implementations of the present technology. As illustrated in FIG. 5A, the RUI 510 includes an RUI bridge 530 that converts information from a smart edge platform component 520 (e.g., native data, controls, and/or settings protocols from a smart edge platform driver, module, interface, and the like) to standard web based protocols, and an RUI Web Interface Server 532 that allows users to access the information from the smart edge platform component through a network-accessible web browser 540 ("browser 540") with a graphical user interface. For example, a user can log into a web paged hosted by the RUI web interface server 352 using their internet browser to view live-streamed camera data, change onboard module settings (e.g., the AI module), add additional IP. Addresses, and the like.

The RUI can use a protocol bridge to translate data and controls between protocols native to the smart edge platform 500 (and the smart edge platform components 520 thereon) and common web protocols such as HTML and JSON. As a result, the RUI web interface server 352 is able to host a web-based user interface that allows any computing device with network access to interact with the smart edge platform component 520, without requiring a user to install any special software onto the computing device. Additionally, or alternatively, the RUI web interface server 532 allows multiple computing devices to interact with the smart edge platform component 520 at once using common web protocols.

Figure 5E:
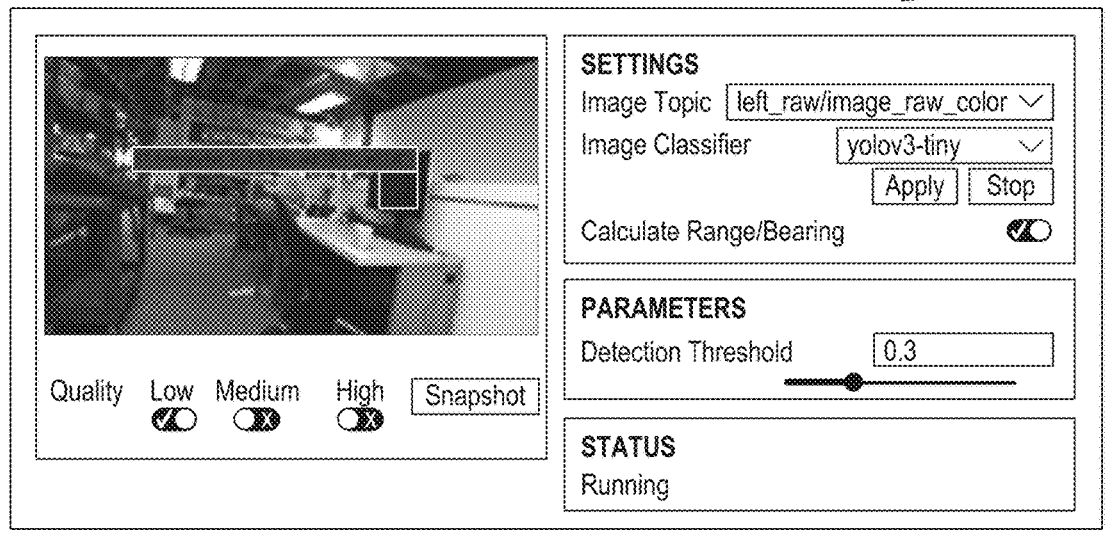
Figures 5F, 5G:
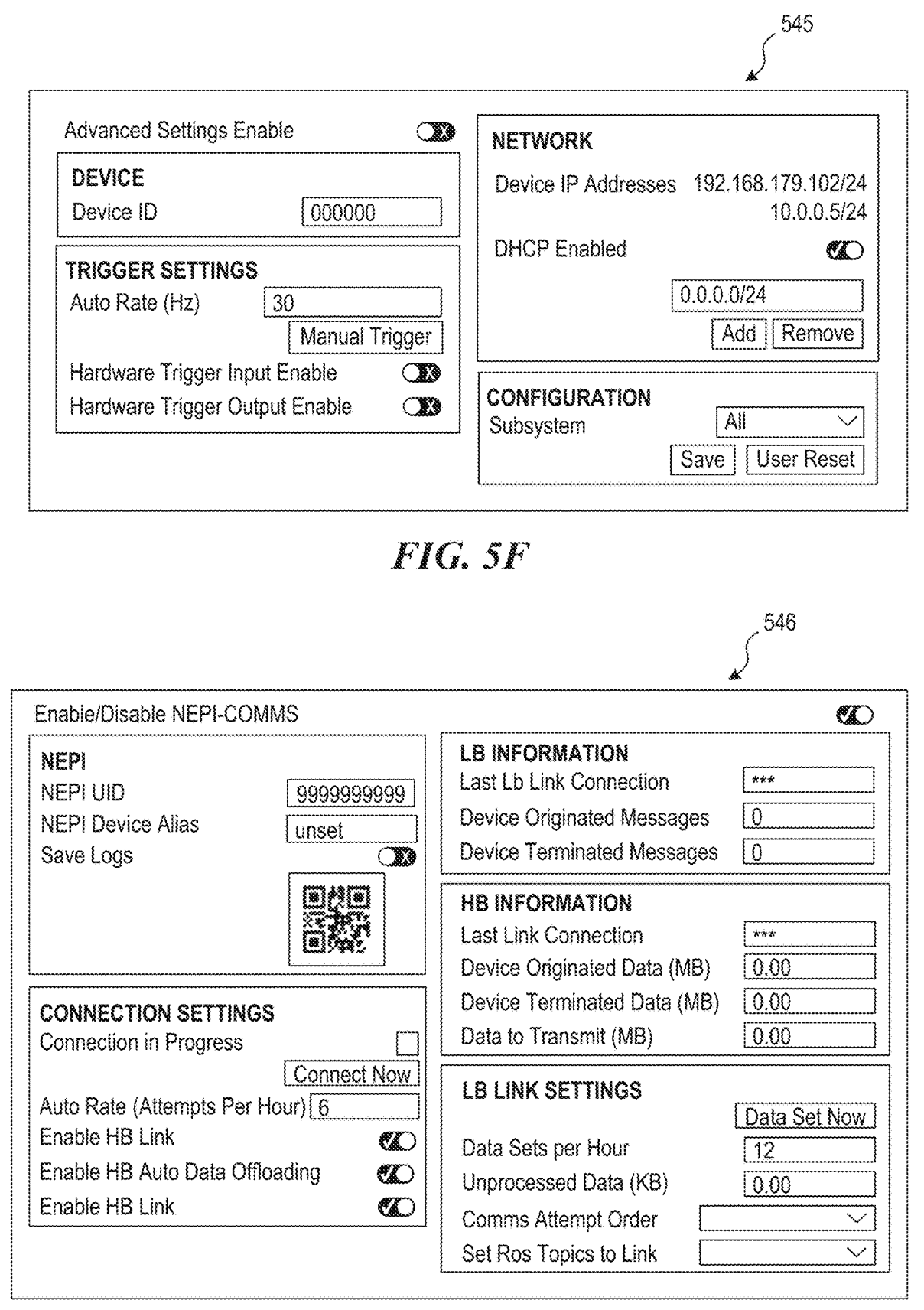

FIGS. 5B-5G illustrate examples of user interfaces hosted by the RUI web interface server 532 and displayed on a user's network-accessible web browser 540 of FIG. 5A in accordance with some implementations of the present technology. More specifically, the smart edge platform 500 (FIG. 5A) can communicate with through the RUI web interface server 352, which executes one or more documented APIs, to allow the RUI 510 to support user access through the browser 540. For example, the user can access the server over the internet to access a smart edge platform's login webpage 541 illustrated in FIG. 5B, a system dashboard webpage 542 illustrated in FIG. 5C, a sensor module interface webpage 543 illustrated in FIG. 5D, an AI module interface webpage 544 illustrated in FIG. 5E, a system settings webpage 545 illustrated in FIG. 5F, a remote operations interface management webpage 546 illustrated in FIG. 5G, and the like. For example, as illustrated in FIG. 5E, the user can view AI module detection results real-time and adjust AI module settings such as AI model selection and/or AI detection threshold through the AI module interface webpage 544.

Figure 6:
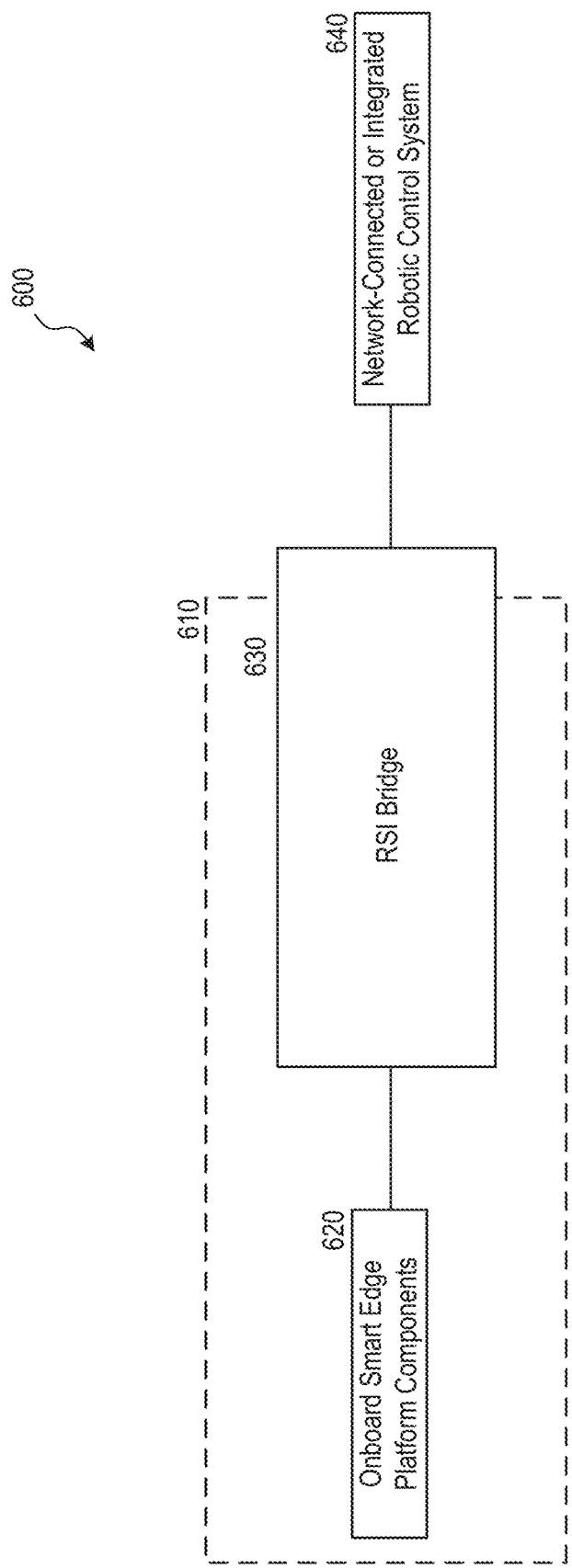
FIG. 6 is a schematic diagram illustrating aspects of a robotic system interface on a smart edge platform in accordance with some implementations of the present technology.

FIG. 6 is a schematic diagram illustrating aspects of a robotic system interface 610 on a smart edge platform 600 in accordance with some implementations of the present technology. As illustrated in FIG. 6, the RSI 610 includes an RSI bridge 630 between onboard smart edge components 620 (e.g., onboard drivers, modules, interfaces, and the like) and a network-connected robotic control system 640 (e.g., various robotic and/or actuatable components). The RSI bridge 630 allows both the onboard smart edge components 620 and the robotic control system 640 to operate and communicate through protocols native to the onboard smart edge components 620 and the robotic control system 640 (e.g., the Robotic Operating System (ROS) protocol). As a result, for example, the robotic control system 640 can communicate with the smart edge platform 600 in a plug and play manner.

Figure 7:
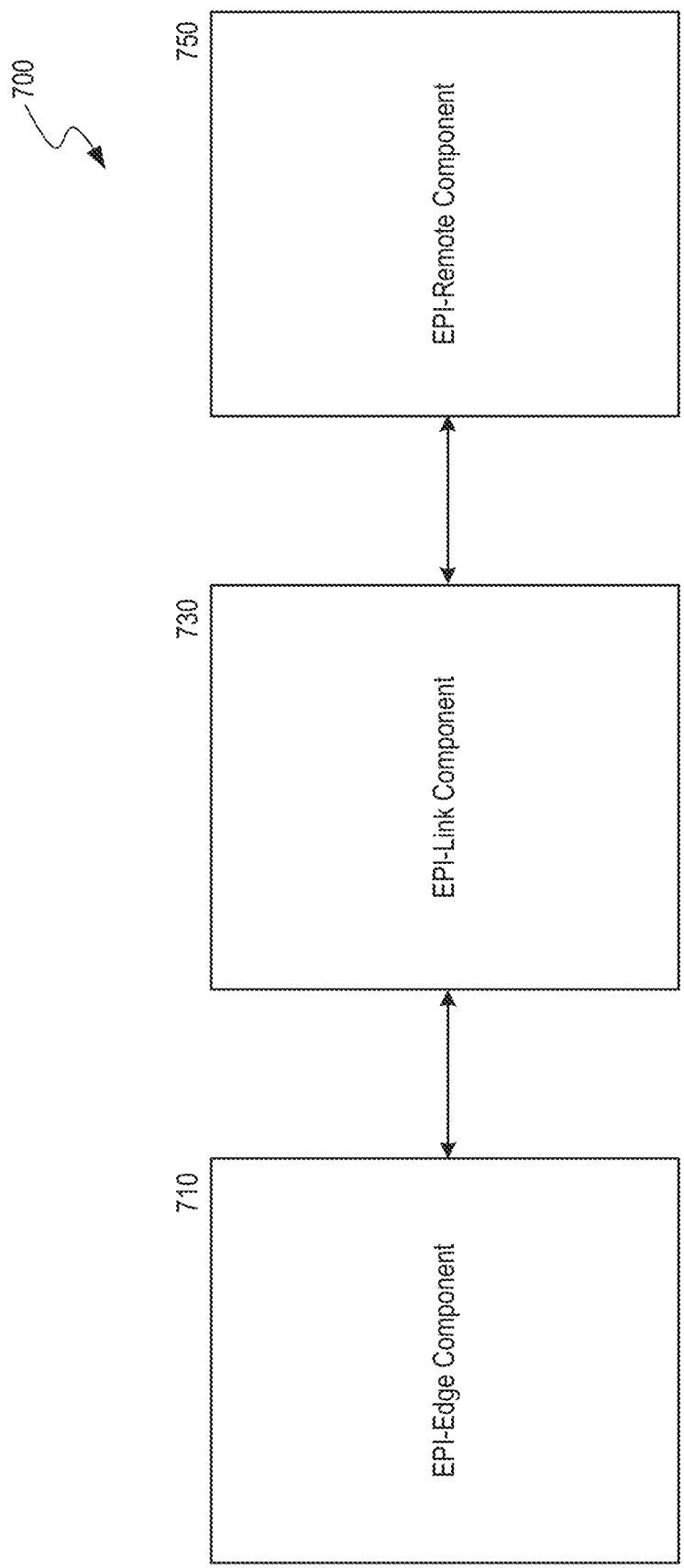
FIG. 7 is a schematic diagram illustrating aspects of a remote operations interface on a smart edge platform in accordance with some implementations of the present technology.

FIG. 7 is a schematic diagram illustrating aspects of an ROI framework 700 for a smart edge platform in accordance with some implementations of the present technology. In the illustrated implementation, the ROI framework 700 includes an edge component 710, a ROI-linking component 730, and a remote component 750. As illustrated in FIG. 7, the edge component 710 is communicatively coupled to the remote component 750 through the ROI-linking component 730. Although the ROI-linking component 730 is illustrated as separate from the edge component 710 and the remote component 750 in FIG. 7, the ROI-linking component 730 can include sub-components that are implemented in the edge component 710 and/or the remote component 750. Purely by way of example, the ROI-linking component 730 can include a first component integrated with the edge component 710 and a second sub-component integrated with the remote component 750. An example of an ROI interface could include a device side messaging interface, a satellite communications interface, and a server-side messaging interface.

The edge component 710 can include all of the smart edge platforms, and the components thereof, discussed above. For example, the edge component 710 can include various onboard modules related to receiving and/or processing sensor data; onboard modules related to controlling the smart edge platform, any sensors integrated with and/or coupled to the smart edge platform, and/or any actuatable components integrated with and/or coupled to the smart edge platform; onboard data storage modules; and/or various software management systems. The remote component 750 can include a remote server (e.g., a cloud-based server, network-accessible server, and the like). The remote component can store additional modules that can be deployed on the edge component 710; receive updates related to the operation of the edge component 710 from a user then communicate the updates to the edge component 710; provide additional processing capabilities to support the edge component 710; and the like.

The ROI-linking component 730 can provide an abstracted bridge that allows the edge component 710 to communicate information (e.g., data from one or more onboard modules, position data, orientation data, and the like) to the remote component 750. That is, the ROI-linking component 730 can allow the edge component 710 to communicate information to the remote component 750 without requiring the remote component to have software specific to the sources of the information. As a result, sensors can be deployed in the edge component 710 in an ad-hoc manner.

In various implementations, the edge component 710 and/or the ROI-linking component 730 can determine which information to communicate based on the available communication channels and/or a prioritization of the information. Additionally, or alternatively, the ROI-linking component 730 can allow the remote component 750 to communicate information (e.g., control signals, software updates, configuration updates, and the like) to the edge component 710 whenever appropriate communication channels (e.g., ethernet, WiFi, serial, cellular, satellite, shortwave short-range wireless, laser, acoustic) are available.

Further, in various implementations, the ROI-linking component 730 can determine which information to communicate from the remote component 750 to the edge component 710 based on the available communication channels and/or the prioritization of the information. For example, the ROI-linking component 730 can receive sensor data from the edge component 710, coordinate with the edge component 710 to process and compress the sensor data (e.g., via onboard modules), identify communication constraints based on available communication channels (e.g., message size limits from a low-bandwidth communication channel), prioritize the sensor data, upload the highest priority sensor data, and/or save or purge non-uploaded sensor data. In another example, the ROI-linking component 730, in conjunction with the remote component 750, can automatically push updates to the edge component 710 when appropriate communication channels are established (e.g., a communication channel with a high enough bandwidth to send a software update). As a result, the ROI-linking component 730 can help overcome limitations typically faced by remotely-deployed edge computing systems with communicating data and/or updating the edge component 710.

Additional details on various aspects of the ROI framework 700 and the ROI-linking component 730 are provided in U.S. patent application Ser. No. 17/733,063 filed Apr. 29, 2022, the entirety of which is incorporated herein by reference.

Figure 8:
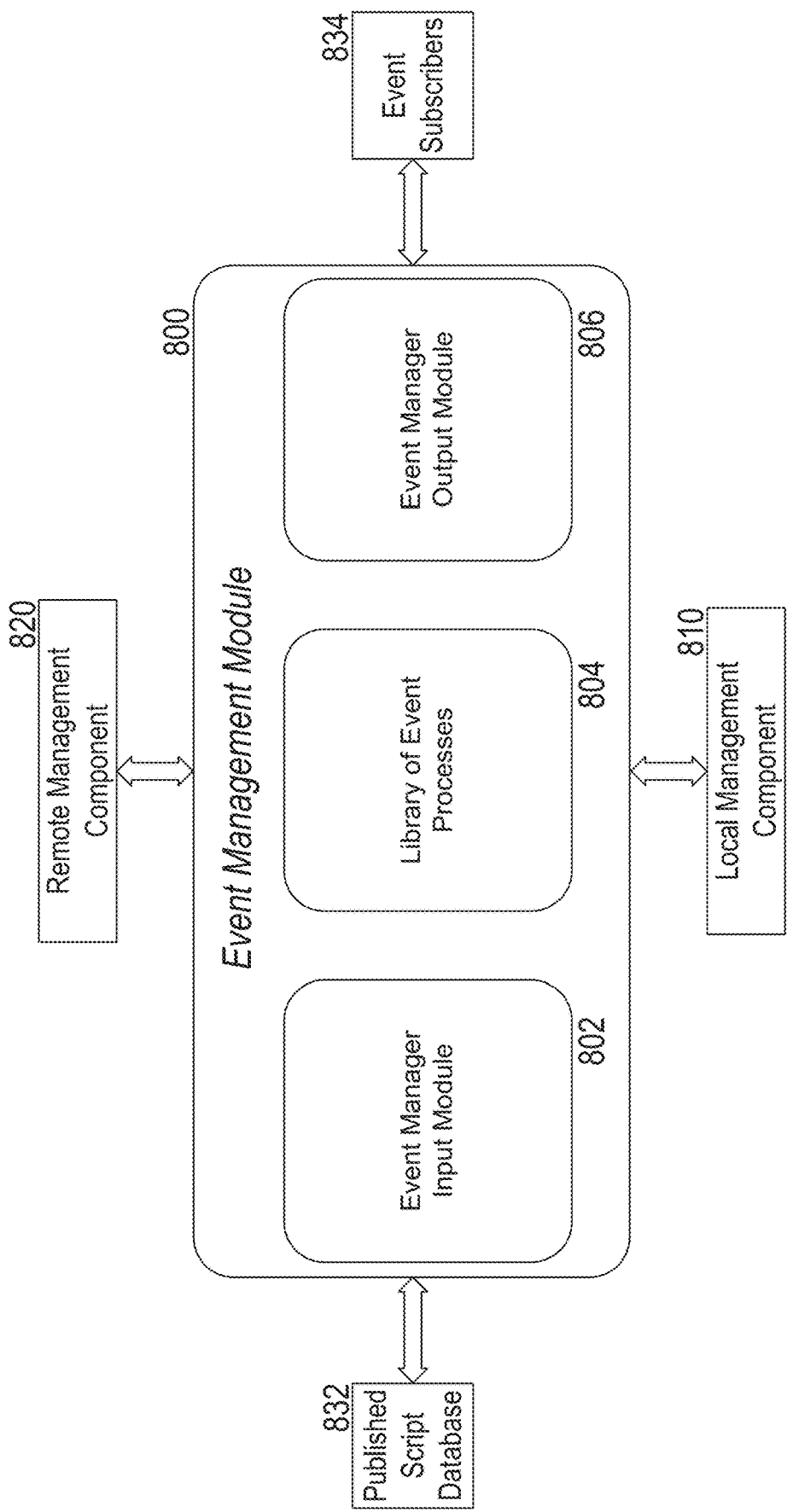
FIG. 8 is a schematic diagram of an event management module for a smart edge platform in accordance with some implementations of the present technology.

FIG. 8 is a schematic diagram of an event management module 800 for use in a smart edge platform in accordance with some implementations of the present technology. In the illustrated implementation, the event management module 800 includes various sub-modules, including an event manager input module 802, a library 804 of event processes in the smart edge platform, and an event manager output module 806. The event manager input module 802 can obtain and/or receive sensor data (e.g., image data, position data, intensity maps, depth maps, and the like), system health data, ai-processed data, and the like for use within the event management module 800. In turn, any of the event processes from the library 804 (e.g., a threshold value detector (e.g., detecting a flow, temperature, pressure, etc. Above a threshold value), a sensor-value recorder (e.g., recording new high-temperatures, geo-forces, pressures, flows, and the like), an anomaly detector, a machine-imaging system, an ai-based image sensing system, and the like) can use the input data, then the event manager output module 806 can output results that include data on a determined event, processed data, labeled data, data with a relevant overlay, information about the system, and/or any other suitable information.

As further illustrated in FIG. 8, the event management module 800 can communicate with a local management component 810 (e.g., another onboard module and/or a local operator) and/or a remote management component 820 (e.g., a remote server or cloud). For example, the event management module 800 can output the results from the output module 806 to another module in the smart edge platform. In a specific, non-limiting example, the results can include an indication of detected anomaly (e.g., potentially indicating a broken pipeline). The results can be communicated to a system management module and/or a sensor module, which can then control one or more sensors to obtain additional measurements to further observe.

Figure 9A:
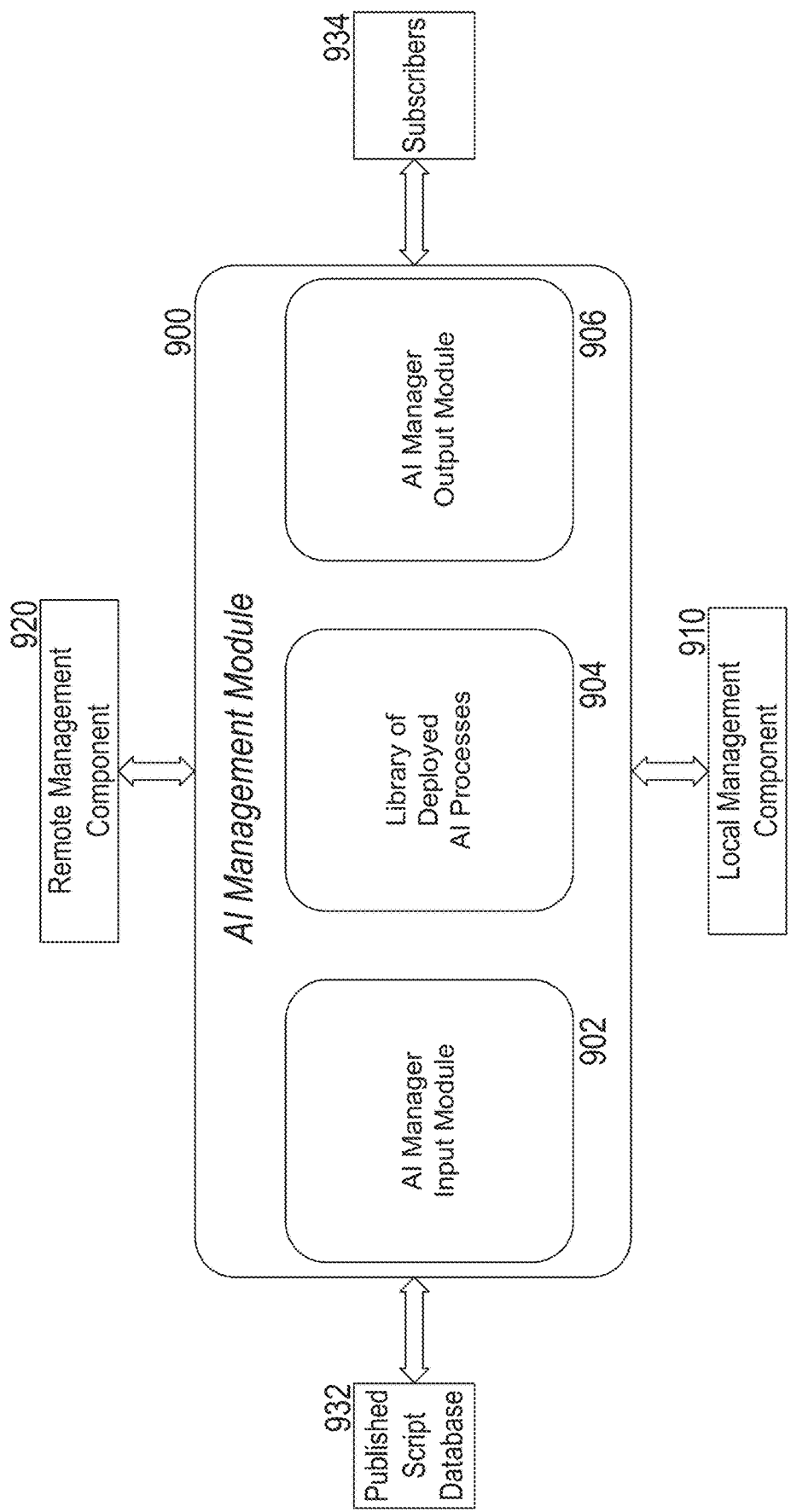
FIG. 9A is a schematic diagram of process for training an AI engine to monitor and control a smart edge platform in accordance with various implementations of the present technology.

Additionally, or alternatively, the event management module 800 can communicate with a published script database 832 (e.g., to download and install new scripts) and/or with one or more parties 834 subscribed to any of the scripts in the library 804. For example, when a given event is detected by one of the scripts in the library 804, the event management module 800 can send onboard modules, connected robotic control systems, or remote users regarding the FIG. 9A is a schematic diagram of an AI management module 900 for monitoring and controlling a smart edge platform in accordance with various implementations of the present technology. In the illustrated implementation, the AI management module 900 includes various sub-modules, such as an AI manager input module 902, a library 904 of AI processes deployed on the platform 300 (FIG. 3), and AI manager output module 906. The AI manager input module 902 can obtain and/or receive sensor data (e.g., image data, position data, intensity maps, depth maps, and the like), system health data, AI metadata, and the like for use within the AI management module 900. In turn, any of the AI processes from the library 904 (e.g., a bottom mine, limpet mine, cable, diver, and the like) can be applied to the input data, then AI manager output module 906 can output results from the library 904.

The results can include data on a determined event, models from the data, one or more updates for the smart edge platform (e.g., to improve efficiency and/or accuracy of operation), one or more application-specific modules, observations about recurring issues in the data, saving data related to a specific event, and the like. As further illustrated in FIG. 9A, the AI management module 900 can communicate the results with a local management component 910 (e.g., another module and/or a local operator) and/or a remote management component 920 (e.g., within a remote server or cloud). For example, where the results include an AI-determined adjustment to sensor operation and/or processing of the sensor data, the AI management module 900 can communicate the results to various relevant onboard modules.

Additionally, or alternatively, the AI management module 900 can communicate with a published script database 932 (e.g., to download and install new scripts) and/or with one or more parties 934 subscribed to any of the scripts in the library 904. For example, when a given script from the library 904 generates an output, the AI management module 900 can send a notification (e.g., through an onboard RUI) to one or more onboard modules, connected robotic control systems, or remote users regarding the output.

Figure 9B:
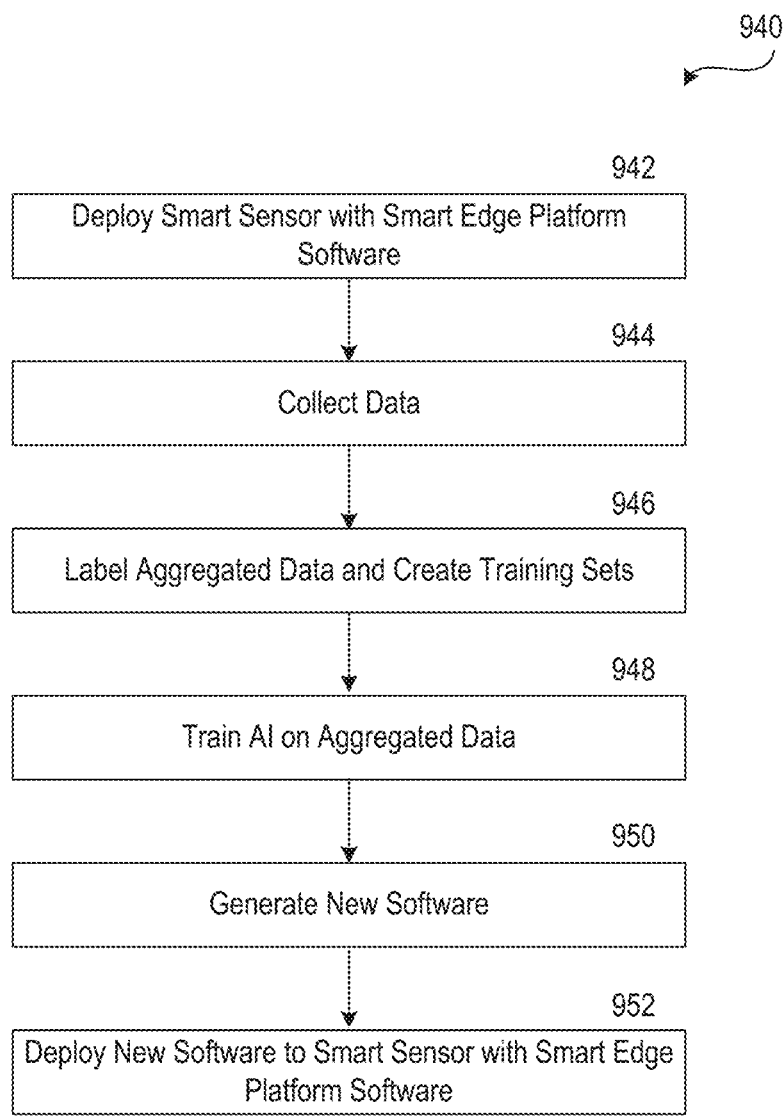
FIG. 9B is a flow diagram of the process for training an AI engine to monitor and control a smart edge platform in accordance with various implementations of the present technology.

FIG. 9B is a flow diagram of a generalized process 940 for training an AI engine to monitor and control a smart edge platform in accordance with various implementations of the present technology. For example, a smart imaging sensor deployed on an underwater pipeline inspection robot can employ onboard AI processing to automatically detect any number of pipeline characteristics (e.g., corrosion, insulation integrity, product leaks, and the like). Such a process requires the initial collection of characteristic image data, labeling the characteristic(s) in the image data, training the AI model against the labeled data, and deploying the created AI model to the smart edge platform. In practice, this process often requires the updating of the smart edge platform's deployed AI models as new data is collected to achieve improved and/or more robust AI detection models (e.g., the reduction of false-positive rates, the inclusion of a wider variety of characteristic sample data, an increase in operational environmental conditions, and the like. In the illustrated implementation, the process 940 begins at block 942 with deploying a smart sensor with the smart edge platform software (e.g., a smart sensor and hardware components discussed in more detail below, the smart edge platform 300 of FIG. 3, and the like).

At block 994, the process 940 collects data from one or more sensors in the smart edge platform (integrated or external), one or more related databases (e.g., an onboard storage device, remote server, and the like), one or more connected devices (e.g., IoT connected devices), and/or from a user of the RUI. Examples of data that might be collected individually or collectively for use in AI/ML training applications includes data from color cameras, infrared cameras, lasers, x-ray, sonar, ultrasound, magnetic, and the like). At block 946, the process 940 labels the aggregated data and creates one or more training sets as well as one or more validation sets from the aggregated data using integrated human and/or automated data labeling and training set creation software tools. The process of labeling data can include, for example, human-based labeling, automated labeling (e.g., using a pre-trained ML model to automatically identify and label characteristics in data), and associated labeling (e.g., using a pre-trained ML model for one type of sensor modality (e.g. color image data) to detect characteristics in that sensor modality data, then automatically labelling data in other sensor modality data (e.g., sonar, laser, x-ray, or the like) collected together). Labeled data sets can then be audited by a human auditor for accuracy and quality, then manually or automatically separated into combinations of training data sets and validation sets used during the AI/ML training process And at block 948, the process 940 trains an AI, ML, or other computer module (sometimes referred to collectively as the "AI model" or "machine learning models") on the training data using integrated AI, ML, or compute software tools. Various AI techniques can be used to develop computing systems capable of simulating aspects of human intelligence, e.g., learning, reasoning, planning, problem solving, decision making, etc. The AI techniques can include, but are not limited to, case-based reasoning, rule-based systems, artificial neural networks, decision trees, support vector machines, regression analysis, Bayesian networks (e.g., naïve Bayes classifiers), genetic algorithms, cellular automata, fuzzy logic systems, multi-agent systems, swarm intelligence, data mining, machine learning (e.g., supervised learning, unsupervised learning, reinforcement learning), and hybrid systems. Similarly, various types of machine learning models, algorithms, and techniques are suitable for use with the present technology. In some implementations, for example, the machine learning model is initially trained on the training set to fit the parameters (e.g., weights of connections between "neurons" in artificial neural networks) of the model. In some implementations, the machine learning model (e.g., a neural network or a naïve Bayes classifier) is trained on the training set using a supervised learning method (e.g., gradient descent or stochastic gradient descent). The training set can include pairs of generated "input vectors" with the associated corresponding "answer vector" (commonly denoted as the target). The current AI model is run with the training data set and produces a result, which is then compared with the target, for each input vector in the training data set. Based on the result of the comparison and the specific learning algorithm being used, the parameters of the model are adjusted. The model fitting can include both variable selection and parameter estimation. The fitted model can be used to predict the responses for the observations in a second data set called the validation data set.

The validation set can provide an unbiased evaluation of a model fit on the training set while tuning the AI model parameters. In some implementations, the validation sets are used for regularization by early stopping, e.g., by stopping training when the error on the validation data set increases, as this may be a sign of overfitting to the training data set. In some implementations, the error of the validation set error can fluctuate during training, such that ad-hoc rules may be used to decide when overfitting has truly begun. Once the model is fully prepared, a test set of additional data can be used to provide an unbiased evaluation of a final AI model fit on the training set.

At block 950, the process 940 generates new software for the smart edge platform using the trained AI model. Examples of outputs are one or more smart sensor-specific modules for the platform; one or more updates to current modules in the smart edge platform; one or more consistent adjustments to the sensor data (e.g., filters based on determined shifts caused by environmental conditions); one or more modules to control the smart edge platform, any integrated and/or connected sensors, and/or any integrated and/or connected robotic systems; one or more indicators of an event (e.g., an indication that a broken pipe is detected in image data); one or more messages for a user (e.g., related to an event, sensor operating conditions, etc.); and the like.

At block 952, the process 940 deploys the new software on the smart sensor with the smart edge platform software to provide any of the updates discussed above (e.g., and/or deploring a new sensor system with the new software). For example, the insights from a first generation of a deployed smart edge platform can be used to generate modules for a second generation of the smart edge platform, and so on. Additionally, or alternatively, the outputs can continuously update the first generation of the smart edge platform to refine the measurements, operation, and control of the smart edge platform (and/or any connected robotics systems) over time. Accordingly, in some implementations, after block 952, the process 900 can return to block 942 to deploy the second generation of smart edge platforms and/or block 944 to collect more data.

Figure 10A:
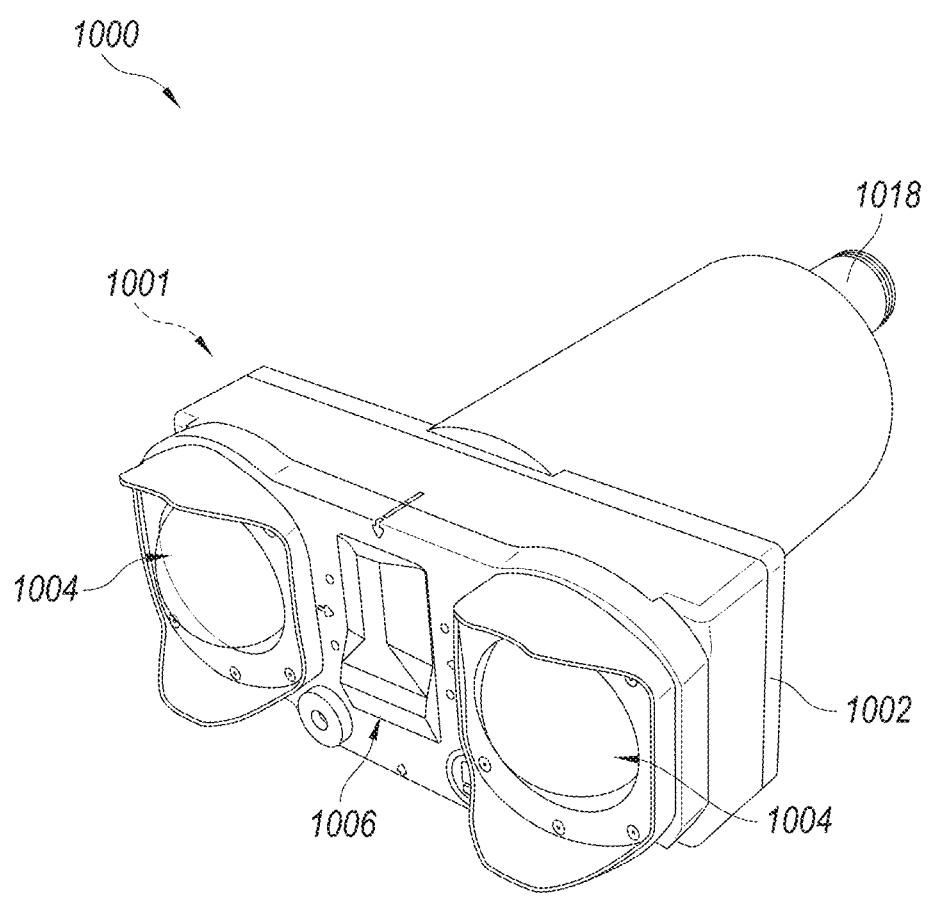
FIG. 10A is a partially schematic isometric of a smart edge system with a smart edge platform in accordance with some implementations of the present technology.

FIG. 10A is a partially schematic isometric view of a smart edge system 1000 with a smart edge platform 1001 in accordance with some implementations of the present technology. In the illustrated implementation, the smart edge system 1000 includes a housing 1002 that can provide water resistant (or waterproof) and/or shock resistant (or shockproof) protection to components of the smart edge platform 1001. That is, the housing 1002 can form a fluid tight seal that can help protect the internal electronics from water, dirt, and/or other contaminants. In various implementations, the housing 1002 can include a metal and/or another suitable material.

The smart edge system 1000 also includes integrated image sensors 1004 (e.g., color cameras, high-definition cameras, 3D color cameras, 3D high-definition cameras, and the like) and sonar sensors 1006. Similar to the integrated sensors discussed above, and as discussed in more detail below, the image sensors 1004 and sonar sensors 1006 can be coupled to various modules of the smart edge platform 1001. In the illustrated implementation, the smart edge system 1000 also includes an abstracted sensor driver 1018 that is couplable to a variety of sensors. The abstracted sensor driver 1018 allows additional sensors to be added to the smart edge system 1000 in an ad-hoc manner, allowing the smart edge system 1000 to be quickly customized to a desired function.

Figure 10B:
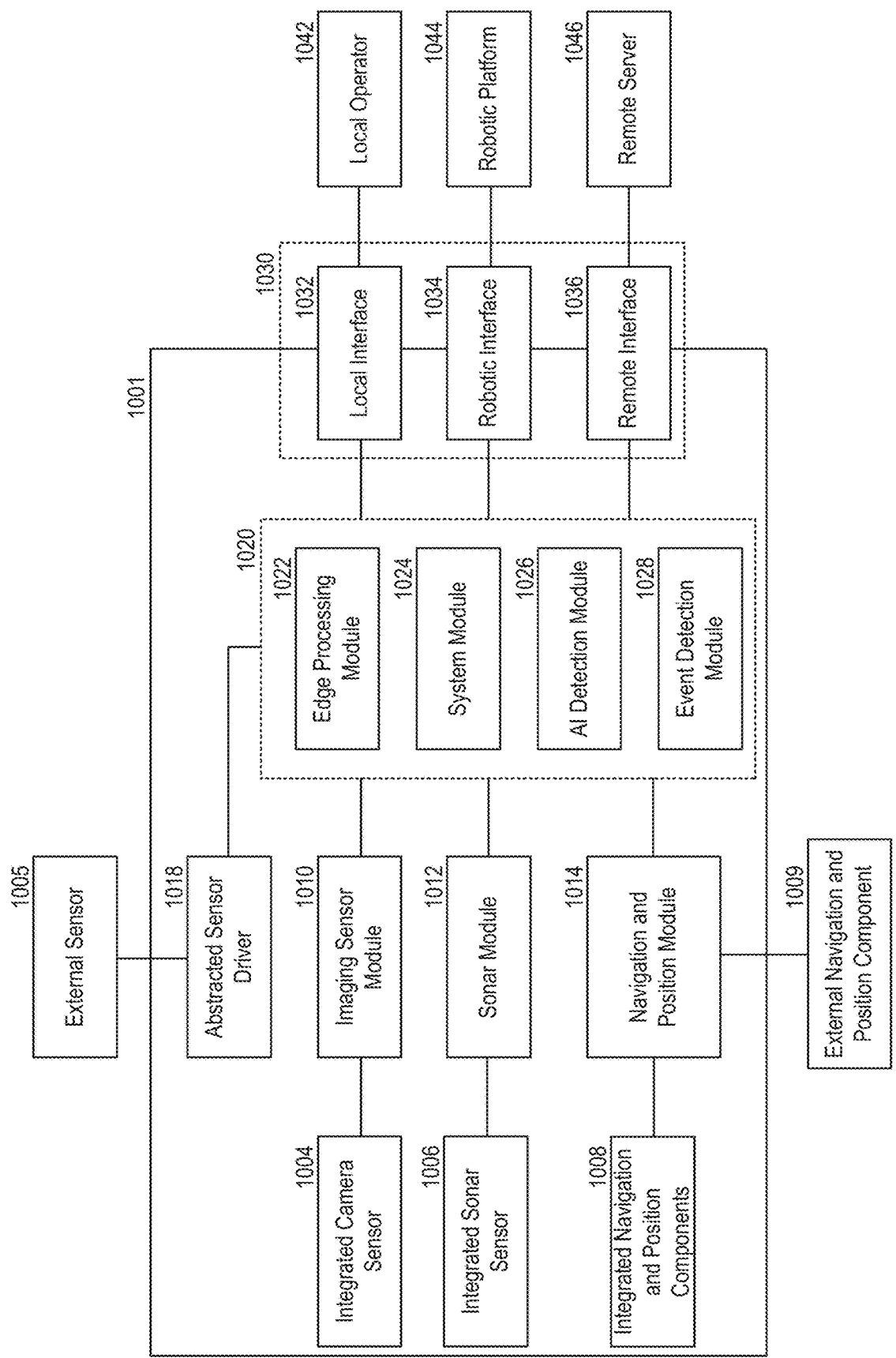
FIG. 10B is a schematic diagram of the smart edge platform incorporated into the smart edge system of FIG. 10A in accordance with some implementations of the present technology.

FIG. 10B is a schematic diagram of the smart edge platform 1001 incorporated into the smart edge system 1000 of FIG. 10A in accordance with some implementations of the present technology. Similar to the smart edge platform 300 discussed above with reference to FIG. 3, the smart edge platform 1001 various integrated modules related to the integrated components of the smart edge platform 1001. In the illustrated implementation, for example, the smart edge platform 1001 includes an imaging sensor module 1010 that is operatively coupled to the image sensors 1004 and a sonar module 1012 that is operatively coupled to the sonar sensors 1006. The imaging sensor module 1010 can translate information (e.g., image data and/or control signals) between protocols native to the image sensors 1004 and one or more modules in an edge software system 1020 on the smart edge platform 1001. Additionally, or alternatively, the imaging sensor module 1010 can automatically control the image sensors 1004 based on a stored set of controls. Similarly, the sonar module 1012 can translate information (e.g., sonar data and/or control signals) between protocols native to the sonar sensors 1006 and the modules in the edge software system 1020. Additionally, or alternatively, the sonar module 1012 can automatically control the sonar sensors 1006 based on a stored set of controls.

As further illustrated in FIG. 10B, the smart edge platform 1001 also includes a navigation and position module 1014 that is operatively coupled to integrated navigation and position components 1008 (e.g., an inertial measurement unit (IMU) system, a simultaneous localization and mapping (SLAM) system, a GPS, an inertial navigation system (INS), and the like). Similar to the imaging sensor module 1010 and the sonar module 1012, the navigation and position module 1014 can translate information (e.g., sensor data and/or control signals) between protocols native to the integrated navigation and position components 1008 and the modules in the edge software system 1020. Additionally, or alternatively, the navigation and position module 1014 can automatically control the navigation and position components 1008 based on a stored set of controls.

The smart edge platform 1001 can also include features for coupling external sensors and other components into the smart edge platform 1001. For example, the smart edge platform 1001 includes the abstracted sensor driver 1018, which is coupleable to an external sensor 1005 (e.g., another suitable imaging sensor, an environmental sensor, and the like). Further, the navigation and position module 1014 can be communicatively coupled (through another abstracted sensor and/or through a wireless connection such as Bluetooth®) to an external navigation and position component 1009 (e.g., an external GPS, an external INS, and the like).

Information from the integrated and/or external sensors can then be communicated to the edge software system 1020. In turn, the edge software system 1020 can be customized with various modules to receive, process, and/or act on the information. In the illustrated implementation, for example, the edge software system 1020 includes an edge processing module 1022, a system management module 1024, and AI detection module 1026, and an event detection module 1028, examples of each of which are discussed above. After receiving, processing, and/or acting on the information, any the modules of edge software system 1020 can send the information to an interface system 1030 to communicate the information.

As illustrated in FIG. 10B, the interface system 1030 can include a local interface 1032, a robotic interface 1034, and a remote interface 1036. The local interface 1032 (e.g., the RUI 352 of FIG. 3) can allow a local operator 1042 to view the information (e.g., on a screen coupled to the smart edge system 1000) and/or input control information. The local interface 1032 can be useful, for example, to help configure and/or test the smart edge platform 1001 before the smart edge system 1000 (FIG. 10A) is deployed in a remote setting. Additionally, or alternatively, the local interface 1032 can be accessed by a remote operator through a network connection (e.g., through a web browser). In such implementations, the local interface 1032 can allow the remote user to access information from the smart edge platform 1001 without downloading any additional software (e.g., software specific to the onboard sensors). The robotic interface 1034 (e.g., the RSI 354 of FIG. 3) allows the smart edge platform 1001 to communicate information (e.g., controls) to a robotic platform 1044 coupled to the smart edge platform 1001 and/or receive additional information from the robotics platform 1044 (e.g., updates on actions performed). The remote interface 1036 (e.g., the ROI 356 of FIG. 3) can communicate with a remote server 1046 to store information from the smart edge platform 1001, access additional modules, download updates, and the like.

Figure 11:
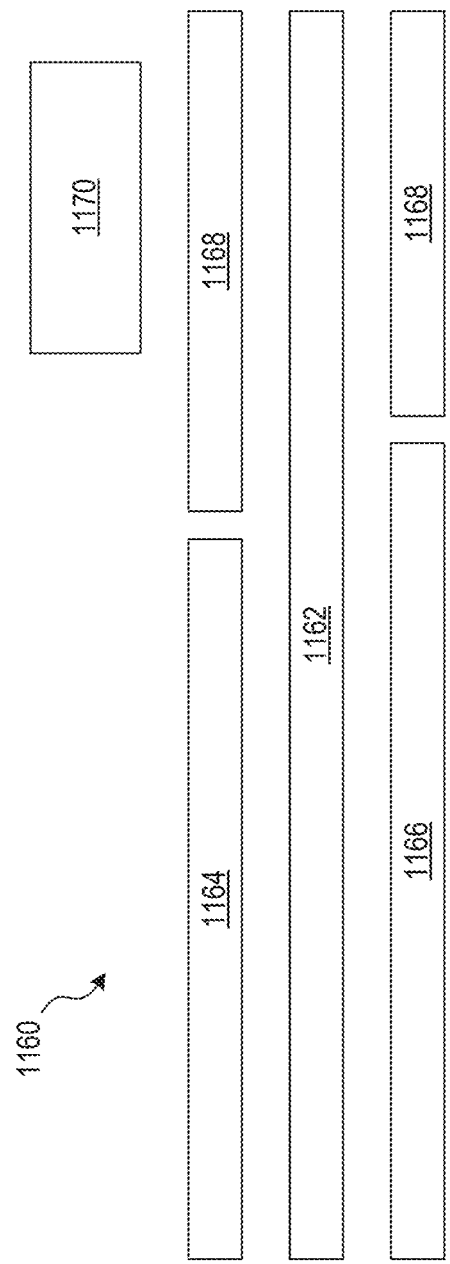
FIG. 11 is a schematic diagram of the electronic components of the smart edge system of FIG. 10A in accordance with some implementations of the present technology.

FIG. 11 is a schematic diagram of the internal electronics 1160 of the smart edge system 1000 of FIG. 10A in accordance with some implementations of the present technology. In the illustrated implementation, the internal electronics 1160 include a base substrate 1162 (e.g., a printed circuit board or other suitable carrying board), a processor 1164 carried to the by the base substrate 1162, a GPU coprocessor 1166 carried by the by the base substrate 1162 opposite the processor 1164, one or more sensor expansion components 1168 (two shown) carried by the base substrate 1162 and, and internal position and orientation sensors 1170 (e.g., an AHRS component) carried by the base substrate 1162 adjacent at least one of the sensor expansion components 1168. The base substrate 1162 can include any suitable support electronics (e.g., electronics common to all processing applications), a redistribution layer coupling any of the internal electronics 1160, and/or one or more through substrate interconnects coupling opposing sides of the base substrate 1162. The sensor expansion components 1168 can be configured to adapt one or more additional application specific, integrated sensors (e.g., imaging sensors) for the smart edge system 1000 of FIG. 10A (e.g., providing a hardware backing for some of the integrated sensors).

Although illustrated in a particular arrangement in FIG. 11, the internal electronics 1160 can be organized in any other suitable way, including on multiple base substrates 1162. Further, the internal electronics 1160 can further include a variety of additional components (e.g., additional processors to increase processing speed, memory devices, sensor expansion components, and the like). Purely by way of example, the internal electronics 1160 can include three, four, five, ten, or any other suitable number of sensor expansion components 1168. In another example, the internal electronics 1160 can include any suitable number of sensor connectors coupled to the processor 1164.

Figure 12A:
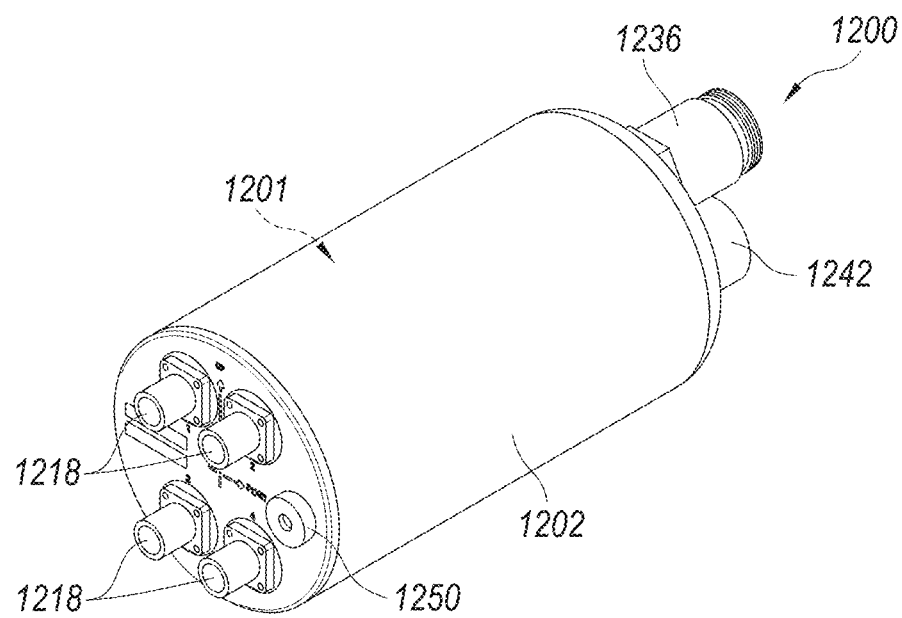
FIGS. 12A-12D are partially schematic views of a smart sensor with a smart edge platform, and components thereof, in accordance with further implementations of the present technology.
Figure 12B:
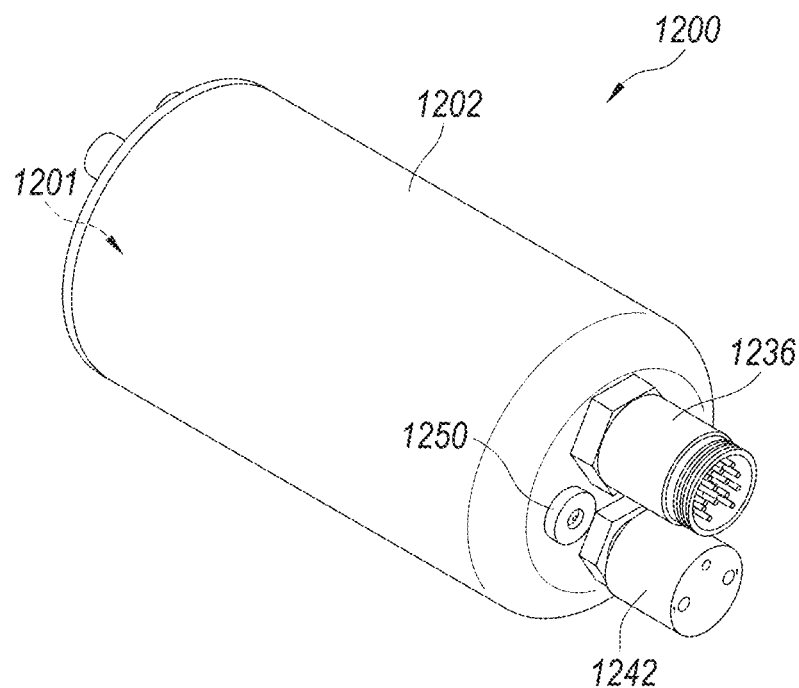
Figure 12C:
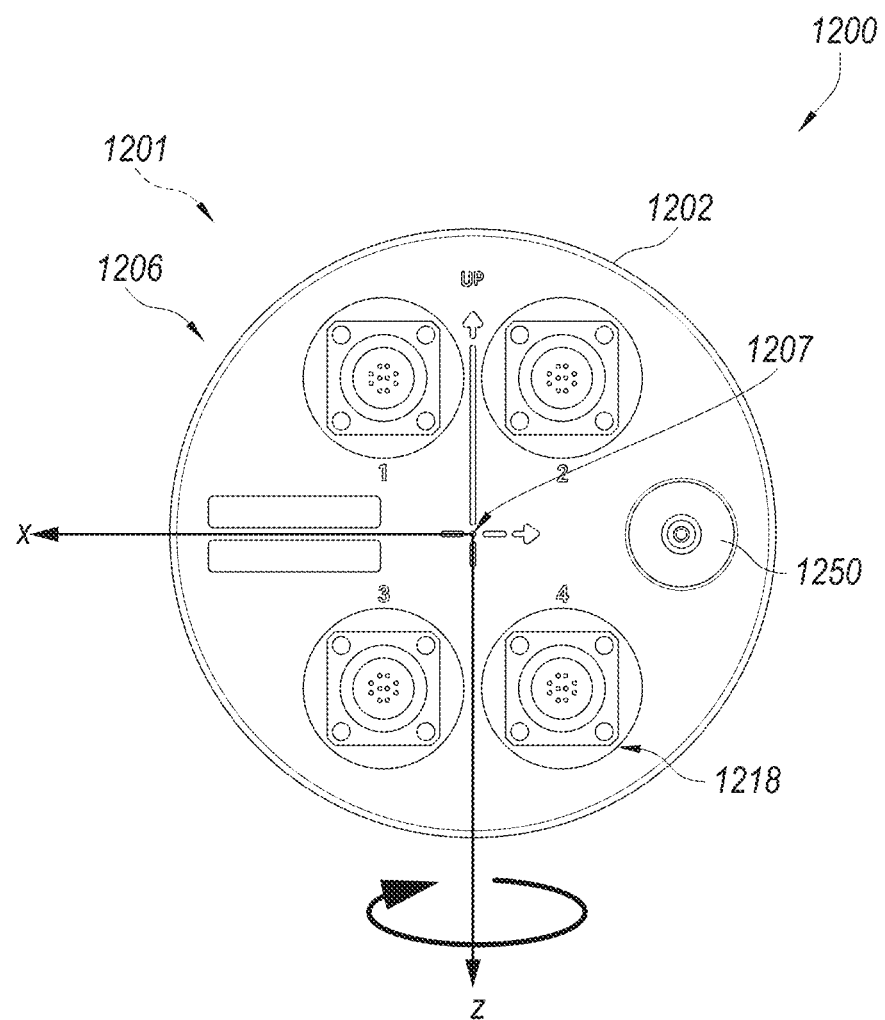

FIGS. 12A-12C are partially schematic isometric front, isometric back, and front views, respectively, of a smart edge system 1200 with a smart edge platform 1201, and components thereof, in accordance with further implementations of the present technology. As illustrated in FIGS. 12A-12C, the smart edge system 1200 includes a housing 1202, one or more abstracted sensor connectors 1218 (four shown) accessible on a first end of the housing 1202, one or more abstracted communication connectors 1236 (one shown) accessible at a second end of the housing 1202, a power connector 1242 accessible at the second end, and one or more sacrificial anodes 1250 (two shown, one on each end of the housing 1202).

The housing 1202 can include a durable, rigid material that protects the hardware components and internal electronics of the smart edge system 1200 from environmental damage. For example, the housing 1202 can protect against atmospheric pressure around the smart edge system 1200 (e.g., from water when the smart edge system 1200 at a depth beneath the surface), heat, cold, impact damage, and the like. In some implementations, the housing 1202 includes a metal and/or another suitable material. Additionally, or alternatively, the housing 1202 can form a fluid tight seal that helps protect the internal electronics from water, dirt, and/or other contaminants.

In some implementations, the sensor connectors 1218 can include one or more sub-groupings of standardizations according to the type of sensor to be connected. For example, imaging sensors can include a first type of standardized connection, while atmospheric sensors can include a second type of standardized connection. In some implementations, the sensor connectors 1218 are fully abstracted within the smart edge system 1200, allowing any type of sensor to be connected to any of the sensor connectors 1218. In various such implementations, one or more converters can be used to connect a wider range of sensors to the sensor connectors 1218. Similarly, the communication connectors 1236 can include one or more sub-groupings and/or can be adapted by one or more converters.

As best illustrated in FIG. 12C, the smart edge system 1200 can include an internal orientation system 1206 and a central reference point 1207. The internal orientation system 1206 can track, record, and communicate information related to the position and orientation of the smart edge system 1200 with respect to the central reference point 1207. In some implementations, the position and orientation of the smart edge system 1200 is used to determine the position and orientation of externally connected components based on known relationships to the central reference point 1207.

In some implementations, one or more of the sensor connectors 1218, the communication connectors 1236, the power connector 1242, and the sacrificial anodes 1250 can be accessible at alternative portions of the housing 1202. Purely by way of example, the communication connectors 1236 and/or the power connector 1242 can be accessible at the first end of the housing 1202. In another example, any of the sensor connectors 1218, the communication connectors 1236, and the power connector 1242 can be positioned along a longitudinal side of the housing 1202. In various implementations, any of the sensor connectors 1218, the communication connectors 1236, and the power connector 1242 can be accessible in a recess in the housing 1202 (e.g., rather than protruding from the housing 1202). Similarly, in some implementations, the central reference point 1207 can be positioned at an alternative point of the housing 1202. For example, the central reference point 1207 can be positioned along a longitudinal side of the housing 1202.

Further, although the illustrated implementation of the smart edge system 1200 includes four of the sensor connectors 1218, any suitable number of the sensor connectors 1218 can be included. For example, the smart edge system 1200 can include one, two, three, five, ten, or any other suitable number of the sensor connectors 1218. Similarly, although the illustrated implementation of the smart edge system 1200 includes four of the communication connectors 1236, any suitable number of the communication connectors 1236 can be included. For example, the smart edge system 1200 can include two, three, four, five, ten, or any other suitable number of the communication connectors 1236.

In the illustrated implementation, the housing 1202 has dimensions of about 18 centimeters (cm) by about 10 cm. In various other implementations, however, the housing 1202 can have any other suitable dimensions. In various implementations, for example, the housing can have a length between about 5 cm and about 50 cm, and/or a diameter of between about 5 cm and about 50 cm.

Figure 12D:
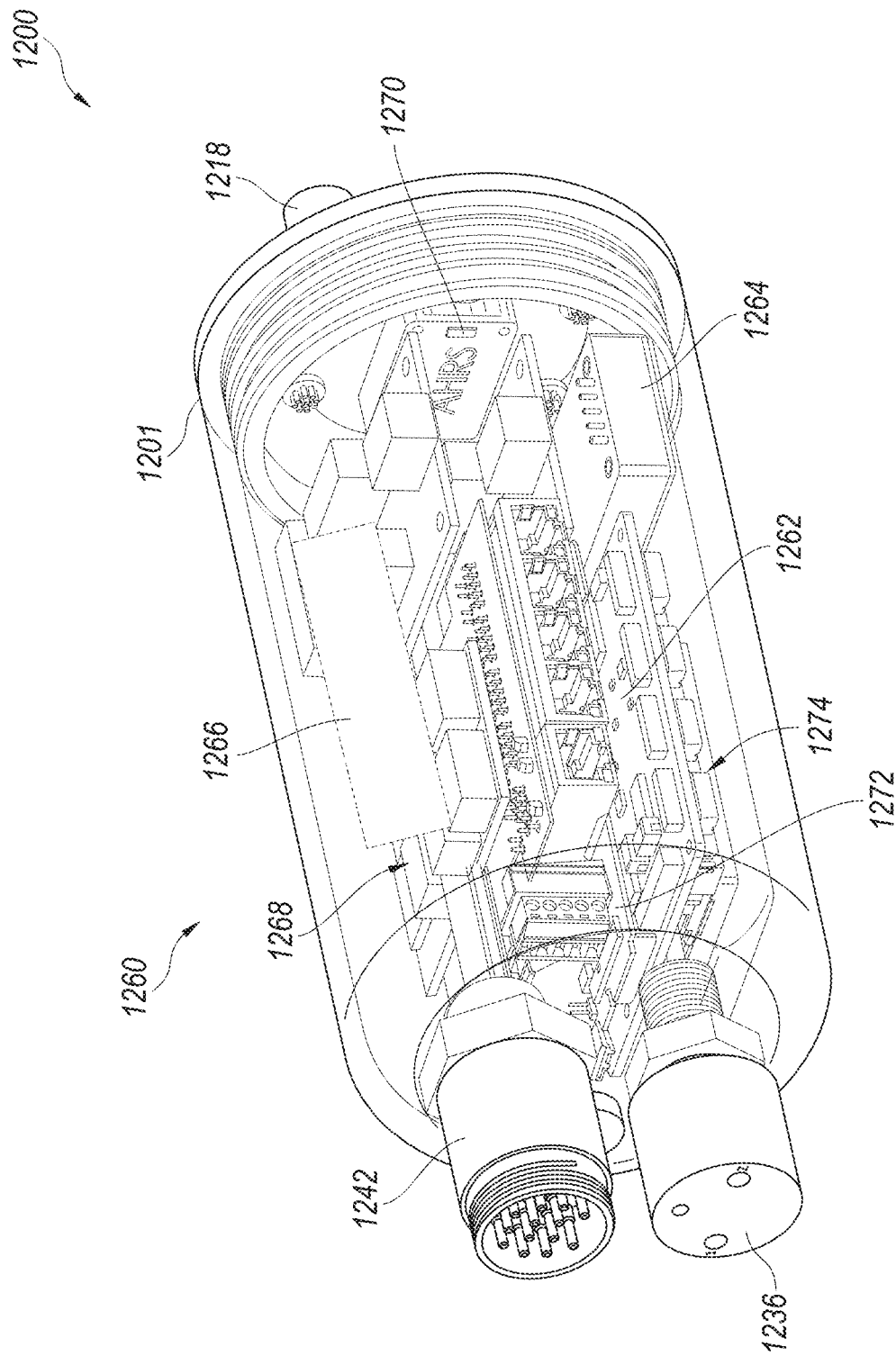

FIG. 12D is a partially schematic diagram isometric view of the internal electronics 1260 of the smart edge system 1200 in accordance with some implementations of the present technology. As illustrated, the internal electronics 1260 can include a carrier substrate 1262 (e.g., a circuit board, a printed circuit board assembly, and the like), one or more processing components, one or more encrypted components (databases and/or active encryption/decryption components), power relaying components, and ethernet switches. As illustrated in FIG. 12D, the internal electronics 1160 can also include a power supply component 1264, an AI-enabled processor 1274 (e.g., an NVIDIA® Xavier NX), a solid state memory (e.g. an SSD component), a USB hub 1266, a serial breakout board 1268, internal position and orientation sensors 1270 (e.g., an altitude and heading reference system (AHRS) component), and an input/output fanout component 1272.

Figure 13:
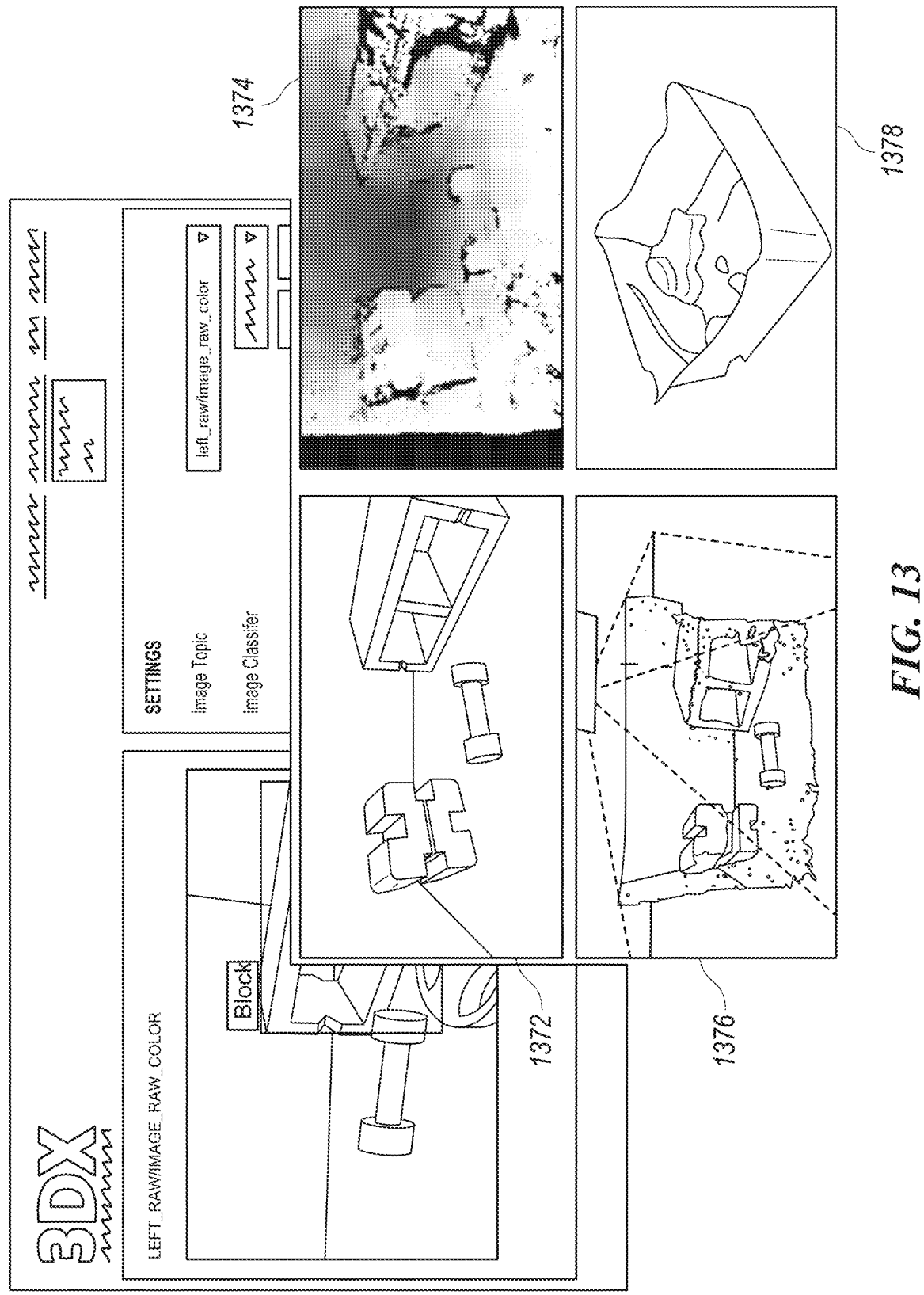
FIG. 13 illustrates various examples of image data obtained from a smart edge platform in accordance with some implementations of the present technology.

FIG. 13 illustrates various examples of image data obtained from a smart edge platform in accordance with some implementations of the present technology. In some implementations, for example, the illustrated image data can be collected, processed, and aggregated by the smart edge system 1000 discussed above with respect to FIGS. 10A-11. In the illustrated implementation, the image data includes raw image data 1372 (e.g., a two-dimensional color image), a 3D point cloud 1374, a depth map 1376, and a three-dimensional model 1378 of the local environment based on the other image data. In various implementations, the image data can include 3D visible light camera data, 3D sonar device data, 3D light detection and ranging (Lidar) sensor data, 3D thermal imaging sensor data, 3D hyperspectral image data, and/or any other suitable image data.

Figure 14A:
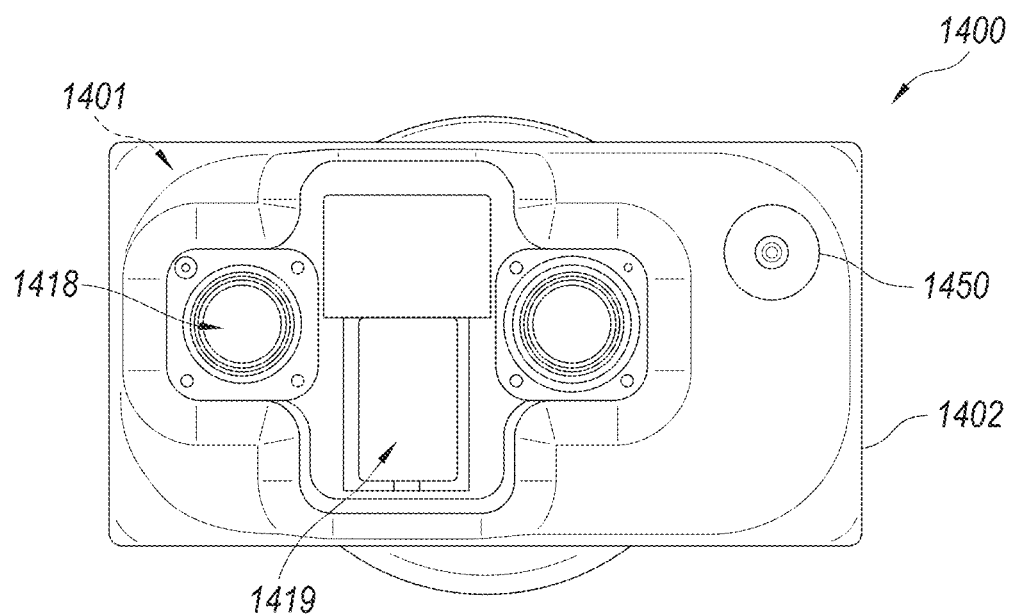
FIGS. 14A-C are partially schematic views of a smart sensor with a smart edge platform, and components thereof, in accordance with further implementations of the present technology.
Figure 14B:
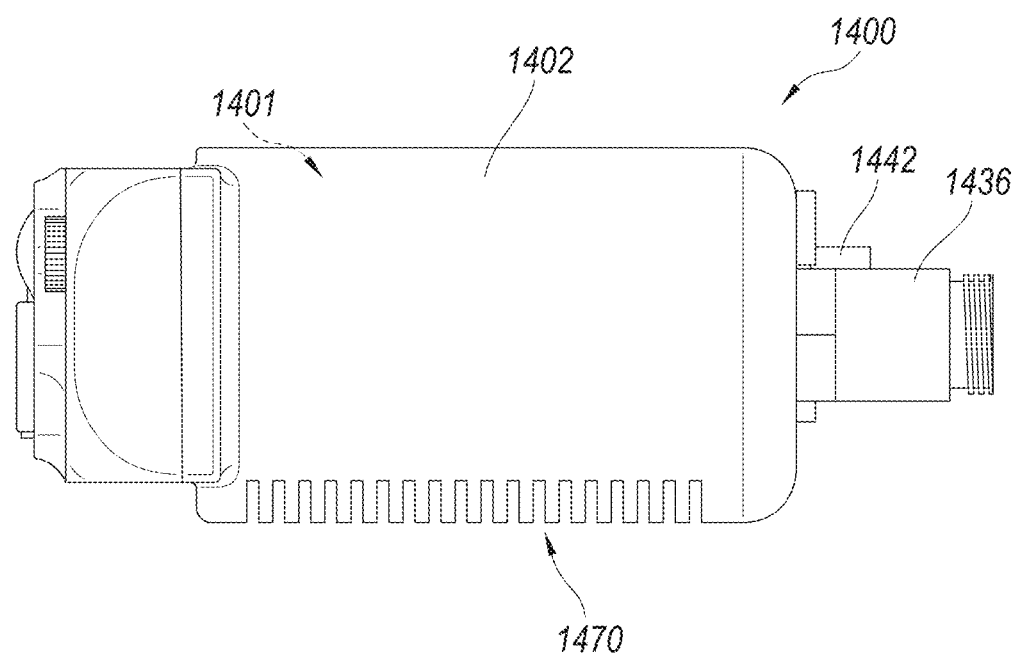
Figure 14C:
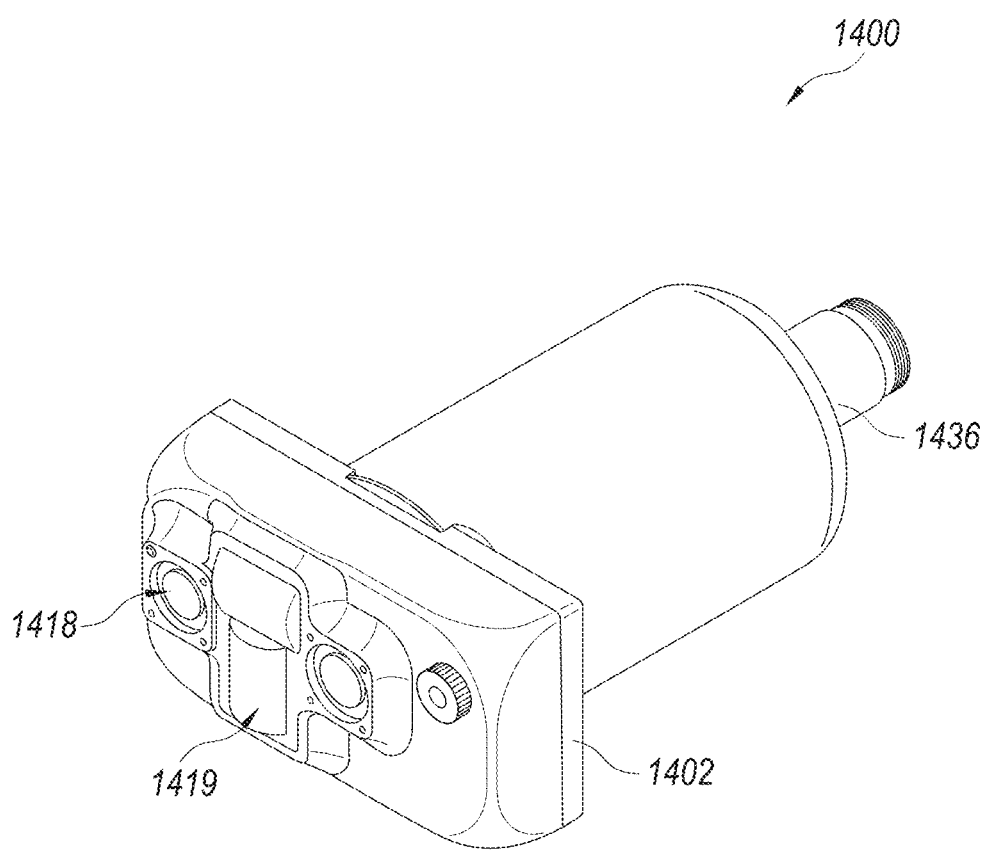

FIGS. 14A-C are partially schematic views of a smart edge system 1400 with a smart edge platform 1401, and components thereof, in accordance with further implementations of the present technology. The smart edge system 1400 is generally similar to the smart sensor systems 1000, 1200 discussed above with respect to FIGS. 10A-12D. For example, the smart edge system 1400 includes a housing 1402 that can include a durable, rigid material that protects the hardware components and internal electronics of the smart edge system 1400 from environmental damage and/or damage from water, dirt, and/or other contaminants. The smart edge system 1400 also includes one or more abstracted sensor connectors 1436 (one shown), a power connector 1442, and one or more sacrificial anodes 1450 (one shown). In the illustrated implementation, the smart edge system 1400 further includes two integrated imaging sensors 1418 (e.g., a 3D stereo camera and a 3D high frequency sonar device), along with one or more (one shown) environmental sensors 1419. As further illustrated in FIG. 14B, the housing can include a grooved structure 1470 configured to dissipate heat away from internal electronics in the smart edge system 1400.

In some implementations, the smart edge system 1400 can include additional abstracted sensor connectors 1436. The sensor connectors 1436 can be accessible on any suitable portion of the housing 1402, for example adjacent the power connector 1442 and/or any position on the housing 1402. Further, similar to the implementations discussed above with respect to FIGS. 12A-12C, in some implementations, the sensor connectors 1436 can include one or more sub-groupings of standardizations according to the type of sensor to be connected. For example, imaging sensors can include a first type of standardized connection, while atmospheric sensors can include a second type of standardized connection. In some implementations, the sensor connectors 1436 are fully abstracted within the smart edge system 1400, allowing any type of sensor to be connected to any of the sensor connectors 1436. In various such implementations, one or more converters can be used to connect a wider range of sensors to the sensor connectors 1436. Furthermore, the sensor connectors 1436 can be used to connect to various external communication components (e.g., wireless systems, ethernet systems, and the like).

In some implementations, any of the sensor connectors 1436, the power connector 1442, and the sacrificial anodes 1450 can be accessible at alternative portions of the housing 1402. Purely by way of example, at least one of the sensor connectors 1436 and the power connector 1442 can be positioned on the opposite side of the housing 1402 as the other components. In various implementations, either of the sensor connectors 1436 and the power connector 1442 can be accessible in a recess in the housing 1402 (e.g., rather than protruding from the housing 1402). Additionally, or alternatively, the grooved structure 1470 can be positioned at an alternative point of the housing 1402 and/or cover a different amount of the housing 1402 (e.g., a larger or smaller percentage of the housing 1402). For example, the grooved structure 1470 can completely wrap around the longitudinal side of the housing 1402 rather than being positioned on only a lower side of the housing 1402.

Examples of Suitable Computing Devices and Computing Environments

Figure 15:
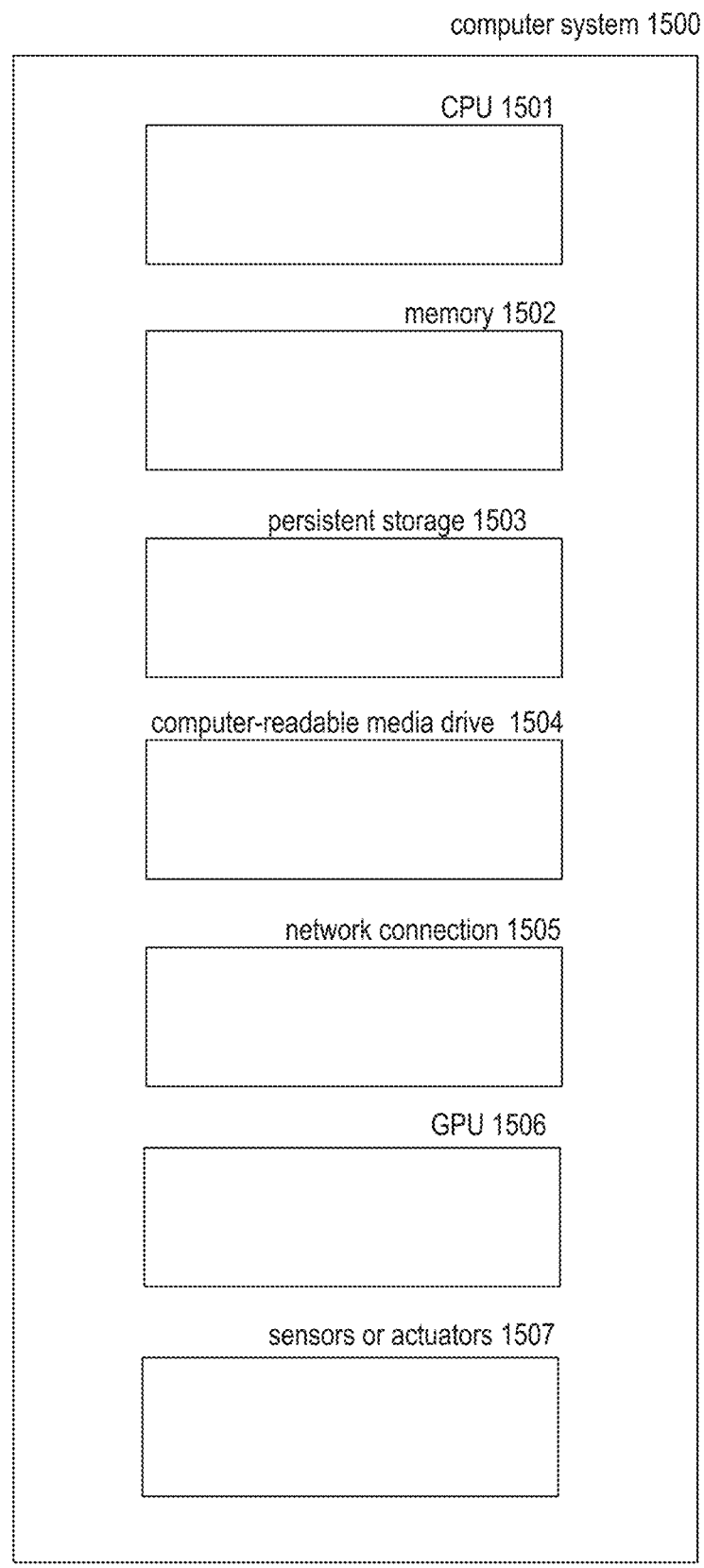
FIG. 15 is a block diagram showing some of the components typically incorporated in at least some of the computer systems and other devices on which the disclosed system operates.

FIG. 15 is a block diagram showing some of the components typically incorporated in at least some of the computer systems and other devices on which the disclosed system operates. In various implementations, these computer systems and other devices 1500 ("system 1500") can include smart sensors or actuators with embedded processors, server computer systems, desktop computer systems, laptop computer systems, netbooks, mobile phones, personal digital assistants, televisions, cameras, automobile computers, electronic media players, web services, mobile devices, watches, wearables, glasses, smartphones, tablets, smart displays, virtual reality devices, augmented reality devices, etc. In various implementations, the computer systems and devices include zero or more of each of the following: a central processing unit (CPU) 1501 for executing computer programs; a graphics processing unit (GPU) 1506 for executing computer programs and processing data (e.g., AI processing), a computer memory 1502 for storing programs and data while they are being used, including the facility and associated data, an operating system including a kernel, and device drivers; a persistent storage device 1503, such as a hard drive or flash drive for persistently storing programs and data; computer-readable media drives 1504 that are tangible storage means that do not include a transitory, propagating signal, such as a floppy, CD-ROM, or DVD drive, for reading programs and data stored on a computer-readable medium; and a network connection, or other communications hardware, 1505 for connecting the computer system to other computer systems to send and/or receive data, such as via the Internet or another network and its networking hardware, such as switches, routers, repeaters, electrical cables and optical fibers, light emitters and receivers, radio transmitters and receivers, satellite communication modems, cellular data modems, and the like. Computer systems may also include a host of connected peripherals such as sensors or actuators 1507, and user interface devices. While computer systems configured as described above are typically used to support the operation of the facility, those skilled in the art will appreciate that the facility may be implemented using devices of various types and configurations, and having various components.

Figure 16:
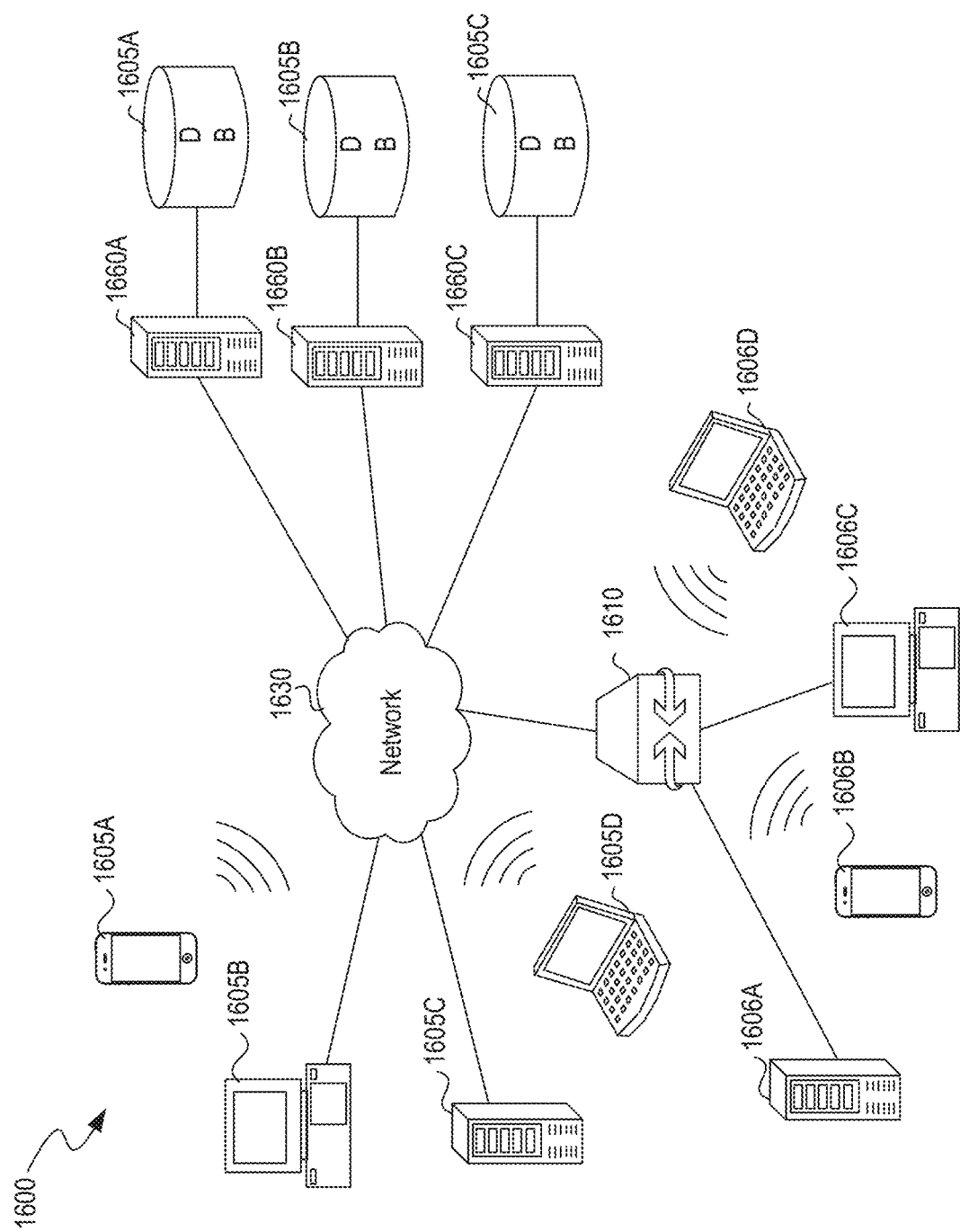
FIG. 16 is a system diagram illustrating an example of a computing environment in which the disclosed system operates in some implementations.

FIG. 16 is a system diagram illustrating an example of a computing environment in which the disclosed system operates in some implementations. In some implementations, environment 1600 includes one or more client computing devices 1605A-D and 1606A-D, examples of which can host the system 1500 of FIG. 15. Client computing devices 1605 and/or 1606 operate in a networked environment using logical connections through network 1630 to one or more remote computers, such as a server computing device. In some cases, several client computing devices may be connected directly to the network with communications between both environment 1600 devices and other connected client computing devices.

In some implementations, servers 1620A-C are edge servers which receive client requests and coordinate fulfillment of those requests. In some implementations, server computing devices 1620 comprise computing systems, such as the system 1500 of FIG. 15. Though each server computing device 1620 is displayed logically as a single server, server computing devices can each be a distributed computing environment encompassing multiple computing devices located at the same or at geographically disparate physical locations. In some implementations, each server 1620 corresponds to a group of servers.

Client computing devices 1605 and/or 1606, and server computing devices 1620 can each act as a server or client to other server or client devices. In some implementations, servers (1620A-C) connect to a corresponding database (1625A-C). As discussed above, each server 1620 can correspond to a group of servers, and each of these servers can share a database or can have its own database. Databases 1625 warehouse (e.g., store) information such as edge device data, remote service data, sensory data, robotic control/manipulation data, machine learning (ML) or AI training data, images/videos, event logs, device management data, user interface content or elements, fleet data, annotated data, cleaned/filtered data, image/video labels, customer data, user data, server data, data analytics, APIs, SDKs, encryption data or keys, etc. Though databases 1625 are displayed logically as single units, databases 1625 can each be a distributed computing environment encompassing multiple computing devices, can be located within their corresponding server, or can be located at the same or at geographically disparate physical locations.

Network 1630 can be a local area network (LAN) or a wide area network (WAN), but can also be other wired or wireless networks. In some implementations, network 1630 is the Internet or some other public or private network. Client computing devices 1605 are connected to network 1630 through a network interface, such as by wired or wireless communication. While the connections between servers 1620 are shown as separate connections, these connections can be any kind of local, wide area, wired, or wireless network, including network 1630 or a separate public or private network. Client computing devices 1606 are connected to network 1630 through communication gateways 1610, which can include satellite, cellular, radio frequency (RF), acoustic communications (ACOMMS), interne protocol (IP), etc.

Conclusion

From the foregoing, it will be appreciated that specific implementations of the technology have been described herein for purposes of illustration, but well-known structures and functions have not been shown or described in detail to avoid unnecessarily obscuring the description of the implementations of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

Implementations of the present disclosure may be implemented as computer-executable instructions, such as routines executed by a general-purpose computer, a personal computer, a server, or other computing system. The present technology can also be embodied in a special purpose computer or data processor that is specifically programmed, configured, or constructed to perform one or more of the computer-executable instructions explained in detail herein. The terms "computer" and "computing device," as used generally herein, refer to devices that have a processor and non-transitory memory, as well as any data processor or any device capable of communicating with a network. Data processors include programmable general-purpose or special-purpose microprocessors, programmable controllers, ASICs, programming logic devices (PLDs), or the like, or a combination of such devices. Computer-executable instructions may be stored in memory, such as RAM, ROM, flash memory, or the like, or a combination of such components.

Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular implementations may also be combined or eliminated in other implementations. Furthermore, although advantages associated with certain implementations of the technology have been described in the context of those implementations, other implementations may also exhibit such advantages, and not all implementations need necessarily exhibit such advantages to fall within the scope of the technology. Accordingly, the disclosure and associated technology can encompass other implementations not expressly shown or described herein.

We claim:

1. A computing system for implementing a smart edge platform, comprising:
   an abstracted sensor driver communicatively coupleable an external sensor to receive sensor data in a first format native to the external sensor;
   one or more communication components communicatively coupleable to one or more external computing devices;
   at least one processor; and
   at least one memory storing computer-executable instructions that, when executed by the at least one processor, control the smart edge platform to:
      instantiate a residential user interface at the smart edge platform, wherein the residential user interface is configured to provide a network-accessible interface to any of the one or more external computing devices via at least one of the one or more communication components;
      receive the sensor data from the external sensor in the first format;
      process the sensor data, wherein processing the sensor data includes converting the sensor data from the first format to a second format native to the residential user interface; and
      send the processed sensor data to the residential user interface enabling the processed data to be accessible to the one or more external computing devices via the residential user interface without running software specific to the external sensor.

2. The computer system for implementing the smart edge platform of claim 1 wherein the one or more communication components are communicatively coupleable to a remote server, wherein the computer-executable instructions further control the smart edge platform to:
   instantiate a remote operations interface to:
      download, from the remote server, a processing module related to the sensor data from the external sensor; and
      install the processing module.

3. The computer system for implementing the smart edge platform of claim 1, further comprising:
an integrated sensor; and
a second abstracted sensor driver communicatively coupled to the integrated sensor, wherein the computer-executable instructions further control the smart edge platform to:
receive the sensor data from the integrated sensor in a third format native to the integrated sensor;
process the sensor data, wherein processing the sensor data includes converting the sensor data from the third format to the second format; and
send the processed sensor data from the integrated sensor to the residential user interface.

4. The computer system for implementing the smart edge platform of claim 3 wherein the integrated sensor includes at least one of:
a stereo three dimensional ("3D") camera,
a 3D sonar scanner,
a color camera,
a thermal imaging device, or
a global positioning system component.

5. The computer system for implementing the smart edge platform of claim 3 wherein the integrated sensor includes a navigation and position sensor, wherein the computer-executable instructions further control the smart edge platform to: determine a geographic location of the smart edge platform, geotag the processed sensor data, plan a route to a destination, and/or measure a distance traveled by the smart edge platform using information gathered from the navigation and position sensor.

6. The computer system for implementing the smart edge platform of claim 1 wherein processing the sensor data further includes at least one of: data filtering, noise reduction, data fusion, artificial intelligence-based and/or machine learning-based detection, target ranging and tracking, or data compression.

7. The computer system for implementing the smart edge platform of claim 1 wherein processing the sensor data further includes applying an event detection module to determine whether the sensor data indicates an occurrence of a predetermined event.

8. The computer system for implementing the smart edge platform of claim 1, further comprising one or more actuatable components, wherein the computer-executable instructions further control the smart edge platform to control the one or more actuatable components.

9. The computer system for implementing the smart edge platform of claim 8 wherein the one or more actuatable components include at least one of: a translator motor, a pan motor, a tilt motor, a propeller, a propulsion jet, or a robotic arm.

10. The computer system for implementing the smart edge platform of claim 8 wherein the computer-executable instructions further control the smart edge platform to:
instantiate a robotic system interface accessible to a user of any of the one or more external computing devices;
receive, from the user and through the robotic system interface, one or more commands to action the one or more actuatable components; and
control, based on the one or more commands, the one or more actuatable components.

11. A computer system for implementing a smart edge platform for controlling a smart edge system, the smart edge platform comprising:
one or more sensor drivers, each of the one or more sensor drivers communicatively coupleable to an integrated sensor and/or an external sensor;
one or more system drivers, each of the one or more system drivers communicatively coupleable to an actuatable component, a communication component, and/or a robotic component at the smart edge platform; and
an edge software component communicatively coupled between the one or more sensor drivers and the one or more system drivers, the edge software component including:
one or more sensor modules each configured to:
receive sensor data through the one or more sensor drivers in a format native to each of the integrated sensors and/or the external sensors; and
convert the sensor data into a second format usable downstream from the one or more sensor modules;
an edge processing module communicatively coupled to the one or more sensor modules to receive and process the converted sensor data; and
a residential user interface communicatively coupled to the edge processing module, the residential user interface configured to provide a network-accessible interface to the processed sensor data without requiring download of software specific to the integrated sensors and/or the external sensors.

12. The computer system for implementing the smart edge platform of claim 11 wherein the edge software component further includes an event detection module communicatively coupled to the one or more sensor modules, the event detection module configured to determine, based on the converted sensor data, whether a predetermined event has occurred.

13. The computer system for implementing the smart edge platform of claim 12 wherein:
the edge software component further includes a navigation and position module communicatively coupled to the event detection module; and
when the event detection module determines the predetermined event has an occurrence, the event detection module communicates the occurrence of the predetermined event to the navigation and position module to control a navigation and position system through at least one of the one or more system drivers.

14. The computer system for implementing the smart edge platform of claim 12 wherein:
the edge software component further includes an actuation module communicatively coupled to the event detection module; and
when the event detection module determines the predetermined event has an occurrence, the event detection module communicates the occurrence of the predetermined event to the actuation module to control one or more actuatable components through at least one of the one or more system drivers.

15. The computer system for implementing the smart edge platform of claim 12 wherein:
the event detection module is communicatively coupled to the edge processing module; and
when the event detection module determines the predetermined event has an occurrence, the event detection module communicates the occurrence of the predetermined event to the edge processing module to perform additional processing of the sensor data.

16. The computer system for implementing the smart edge platform of claim 11 wherein the edge software component further includes a robotic system interface operatively coupled to at least one of the one or more system drivers to provide a network-accessible interface to control one or more robotic components communicatively coupled to the smart edge platform.

17. The computer system for implementing the smart edge platform of claim 11 wherein the edge software component further includes a remote operations interface operably coupled to at least one of the one or more system drivers to:
  send the processed sensor data to an external computing device; and
  receive updates related to the edge software component.

18. The computer system for implementing the smart edge platform of claim 17 wherein the updates include at one or more of:
  additional processing modules for processing the converted sensor data;
  updates to the one or more sensors modules; and
  updates to an event detection module on the edge software component.

19. A method for improving operation of a smart edge platform, the method comprising:
  deploying the smart edge platform in a smart edge system, the smart edge platform including:
    one or more sensor drivers, each of the one or more sensor drivers communicatively coupleable to an individual sensor in the smart edge system; and
    an edge software component communicatively coupled to the one or more sensor drivers, the edge software component including:
      one or more sensor modules operatively coupled to the one or more sensor drivers to receive sensor data from each of the individual sensors in the smart edge system and control operation of the individual sensors; and
      at least one processing module configured to receive the sensor data from the one or more sensor modules and process the sensor data;
  collecting sensor data from the individual sensors in the smart edge system;
  training an artificial intelligence model on the sensor data to identify at least one of: (1) updates to the operation of the individual sensors to improve an accuracy of the sensor data, or (2) updates to the processing of the sensor data;
  generating software updates to the edge software component based on the identified updates to the operation of the individual sensors and/or the updates to the processing of the sensor data; and
  deploying the software updates to the edge software component in the smart edge platform.

20. The method of claim 19 wherein the edge software component further includes a remote operations interface communicatively coupleable to a remote computing device, and wherein deploying the software updates to the edge software component includes sending the updates to the edge software component from the remote computing device to the smart edge platform through the remote operations interface.

* * * * *